(12) United States Patent
Akatoki et al.

(10) Patent No.: US 9,075,850 B2
(45) Date of Patent: Jul. 7, 2015

(54) MONITORING SYSTEM AND MONITORING METHOD

(75) Inventors: Hidenori Akatoki, Yokohama (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 13/318,576

(22) PCT Filed: Jun. 28, 2011

(86) PCT No.: PCT/JP2011/064830
§ 371 (c)(1),
(2), (4) Date: Nov. 2, 2011

(87) PCT Pub. No.: WO2013/001609
PCT Pub. Date: Jan. 3, 2013

(65) Prior Publication Data
US 2013/0007262 A1    Jan. 3, 2013

(51) Int. Cl.
*G06F 15/173*    (2006.01)
*G06F 3/048*    (2013.01)
*G06F 11/30*    (2006.01)
(Continued)

(52) U.S. Cl.
CPC ............ *G06F 11/3055* (2013.01); *H04L 43/04* (2013.01); *H04L 43/0817* (2013.01); *H04L 43/0852* (2013.01); *H04L 43/0894* (2013.01); *G06F 11/3006* (2013.01); *G06F 11/3051* (2013.01); *G06F 11/3079* (2013.01); *G06F 11/32* (2013.01)

(58) Field of Classification Search
CPC ........ H04L 43/08; H04L 43/04; H04L 43/067
USPC .......................................................... 709/224
See application file for complete search history.

(56) References Cited

U.S. PATENT DOCUMENTS

| 5,483,468 A | 1/1996 | Chen et al. |
| 7,093,011 B2 | 8/2006 | Hirata et al. |
| 7,096,315 B2 | 8/2006 | Takeda et al. |

(Continued)

FOREIGN PATENT DOCUMENTS

| JP | 05-173853 | 7/1993 |
| JP | 2005-257416 | 9/2005 |

(Continued)

OTHER PUBLICATIONS

PCT International Search Report and Written Opinion on application No. PCT/JP2011/064830 mailed Aug. 2, 2011, 10 pages; with English—language translation of Written Opinion, 1 page.

(Continued)

*Primary Examiner* — Kevin Bates
*Assistant Examiner* — Emad Siddiqi
(74) *Attorney, Agent, or Firm* — Foley & Lardner LLP

(57) ABSTRACT

A monitoring system quantifies either a configuration change or a status change of a monitoring target, and displays a change value thereof. Furthermore, the monitoring target refers to either a monitoring-target apparatus or a component of a monitoring-target apparatus. Moreover, in a case where multiple monitoring information acquisition intervals are used a change value may be computed and displayed for each of multiple monitoring targets. There may also be a case in which a time axis of a chronological graph of monitoring numeric values and a time axis of a chronological graph of change values are displayed collectively.

18 Claims, 30 Drawing Sheets

(51) Int. Cl.
*H04L 12/26* (2006.01)
*G06F 11/32* (2006.01)

(56) References Cited

U.S. PATENT DOCUMENTS

| | | | |
|---|---|---|---|
| 7,143,008 | B2 | 11/2006 | Ochi et al. |
| 8,407,080 | B2* | 3/2013 | Jayaraman et al. .......... 705/7.39 |
| 2005/0209820 | A1 | 9/2005 | Inoue et al. |
| 2007/0129912 | A1 | 6/2007 | Inoue et al. |
| 2008/0250341 | A1* | 10/2008 | Dlugos et al. ................. 715/771 |
| 2008/0270851 | A1 | 10/2008 | Ochi et al. |
| 2012/0311475 | A1* | 12/2012 | Wong ............................ 715/772 |

FOREIGN PATENT DOCUMENTS

JP 2008-276279 11/2008
WO WO 2011/003794 A1 1/2011

OTHER PUBLICATIONS

PCT International Search Report on application No. PCT/JP2011/064830 dated Aug. 2, 2011; 6 pages.

* cited by examiner

Fig. 6

Polling timer table TBL_POLLING 129

| Type of information | Interval | Next information collection start time |
|---|---|---|
| Status information | 15 minutes | 2010/6/8 18:35 |
| Monitoring numeric value | 5 minutes | 2010/6/8 18:25 |
| Configuration information | 1Day | 2010/6/9 18:00 |

Fig. 7

Configuration information management table (node)    TBL_NODE    121

| Node ID | Node type | Node name | IP address | Authentication information (ID/password) | Information collection start time | Group ID |
|---|---|---|---|---|---|---|
| Server1 | SERVER | Server1 | 111.112.113.101 | Administrator/AdminPW1 | 2010/6/8 18:20 | Server1 |
| Server2 | SERVER | Server2 | 111.112.113.102 | Administrator/AdminPW2 | 2010/6/8 18:20 | Server1 |
| Server3 | SERVER | Server3 | 111.112.113.103 | Administrator/AdminPW3 | 2010/6/8 18:20 | Server1 |
| Storage1 | STORAGE | Storage1 | 111.112.113.104 | Administrator/AdminPW4 | 2010/6/8 18:20 | Storage1 |
| FC-Switch1 | FCSWITCH | FC-Switch1 | 111.112.113.105 | Administrator/AdminPW5 | 2010/6/8 18:05 | FC-Switch1 |
| .. | .. | .. | .. | .. | .. | |

Fig. 8

Configuration information management table (component)
TBL_COMPO 122

| Component ID | Component type | Component name | Parent node ID |
|---|---|---|---|
| Server1/LAN_Adapter1 | LAN_ADAPTER | LAN_Adapter1 | Server1 |
| Server1/iSCSI_Disk1 | ISCSI_DISK | iSCSI_Disk1 | Server1 |
| Server2/Application1 | APPLICATION | Application1 | Server2 |
| Server2/FileSystem1 | FILE_SYSTEM | FileSystem1 | Server2 |
| Storage1/DiskDrive1 | STORAGE_DISK | DiskDrive1 | Storage1 |
| Storage1/DiskDrive2 | STORAGE_DISK | DiskDrive2 | Storage1 |
| Storage1/DiskDrive3 | STORAGE_DISK | DiskDrive3 | Storage1 |
| Storage1/DiskDrive4 | STORAGE_DISK | DiskDrive4 | Storage1 |
| Storage1/Volume1 | STORAGE_VOLUME | Volume1 | Storage1 |
| Storage1/Volume2 | STORAGE_VOLUME | Volume2 | Storage1 |
| Storage1/LU1 | STORAGE_LU | LU1 | Storage1 |
| Storage1/LU2 | STORAGE_LU | LU2 | Storage1 |
| Storage1/LU3 | STORAGE_LU | LU3 | Storage1 |
| Storage1/LU4 | STORAGE_LU | LU4 | Storage1 |
| FC-Switch1/Port1 | FC_PORT | Port1 | FC-Switch1 |
| : | : | : | : |

Fig. 9

Group table  GRP_NODE  123

| Group ID | Group name | Node name |
|---|---|---|
| Server1 | SERVER1 | Server1, Server2, Server3 |
| Storage1 | STORAGE | Storage1 |
| FC-Switch1 | FCSWITCH | FC-Switch1 |
| .. | .. | .. |

Fig. 10

Event table  TBL_EVT

| Event ID | Node ID | Component ID | Event or status | Previous information collection start time | Category | Information collection start time | Node change type | Component change type |
|---|---|---|---|---|---|---|---|---|
| E1 | Server1 | Server1/iSCSI_Disk1 | Configuration information change (Change) | 2010/6/7 18:20 | Configuration | 2010/6/8 18:20 | Changed | Changed |
| E2 | Server1 | Server1/CPU1 | Add | 2010/6/7 18:20 | Configuration | 2010/6/8 18:20 | Changed | Added |
| E3 | Server2 | Server2/Application1 | Unacquirable (Missing) | 2010/6/8 18:05 | Status | 2010/6/8 18:20 | Changed | Removed |
| E4 | Server2 | Server2/Application2 | Error | – | Status | 2010/6/8 18:20 | Changed | Added |
| E5 | Storage1 | Storage1/LU1 | Unacquirable (Missing) | 2010/6/8 18:05 | Status | 2010/6/8 18:20 | Changed | Removed |
| E6 | Server2 | Server2/Application2 | Overload | – | Status | 2010/6/8 18:20 | Changed | Added |
| E7 | FC-Switch1 | FC-Switch1 | Add | – | Configuration | 2010/6/8 18:05 | Added | Not Changed |

Event totaling table   TBL_EVTTOTAL   126

| Time | Change value | Node change type | Component change type | Node ID | Component ID |
|---|---|---|---|---|---|
| 6/8 18:10 | 0.01 | Chanded | Added | Server2 | Server2/Application1 |
| 6/8 18:10 | 0.10 | Changed | Missing | Storage1 | Storage1/LU1 |
| 6/8 18:11 | 0.01 | Chanded | Added | Server2 | Server2/Application1 |
| . . . | | | | | |

Fig. 13

Event totaling result table   TBL_EVTTOTALRESULT                                  128

| Filter name | Time | Change value | Node change type | Component change type | Node ID | Component ID |
|---|---|---|---|---|---|---|
| A | 6/8 18:10 | 0.0007 | Changed | Added | Server1 | Server1/CPU1 |
|   | 6/8 18:10 | 0.0007 | Changed | Added | Server1 | Server1/iSCSI_Disk1 |
|   | ... | ... | ... | ... | ... | ... |
|   | 6/8 18:11 | 0.0007 | Changed | Added | Server1 | Server1/CPU1 |
|   | 6/8 18:11 | 0.0007 | Changed | Changed | Server1 | Server1/iSCSI_Disk1 |
|   | ... | ... | ... | ... | ... | ... |
| B | | | | | | |

Fig. 14A

Event search result table   TBL_EVTRESULT   127

| Event ID | Node ID | Component ID | Event or status | Previous information collection start time | Category | Information collection start time | Node change type | Component change type | Probability |
|---|---|---|---|---|---|---|---|---|---|
| E3 | Node2 | Server2/Application1 | Unknown | 2010/6/8 18:10 | Status | 2010/6/8 18:20 | Changed | Removed | 17% |
| E5 | Node4 | Storage1/LU1 | Unknown | 2010/6/8 18:10 | Status | 2010/6/8 18:20 | Changed | Removed | 17% |

Fig. 14B

Change type table   TBL_EVTPAT   130

| Node change type, component change type |
|---|
| Any |
| Added node |
| Removed node |
| Changed node – Add component |
| Changed node – Removed component |
| Changed node – Changed component |

Fig. 14C

Duration A table   TBL_TIMEPAT   131

| Duration |
|---|
| 1 hour |
| 6 hours |
| 12 hours |
| 24 hours |
| 7 days |
| 14 days |
| 30 days |
| 60 days |

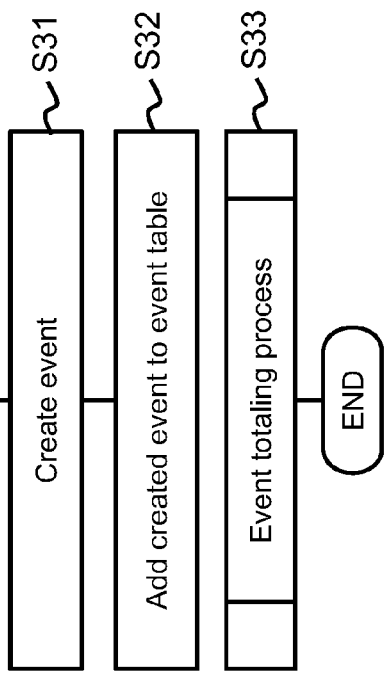
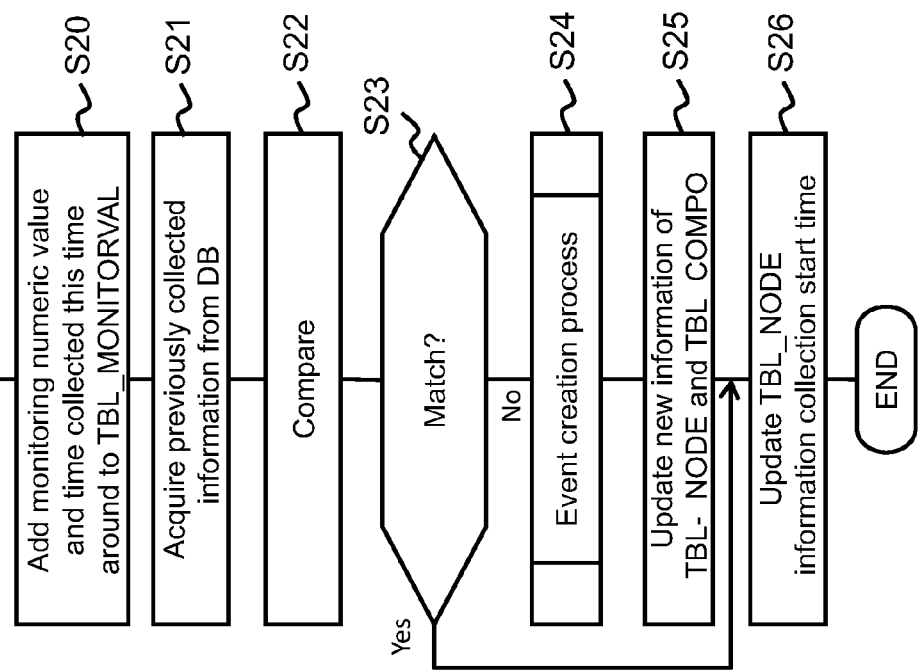

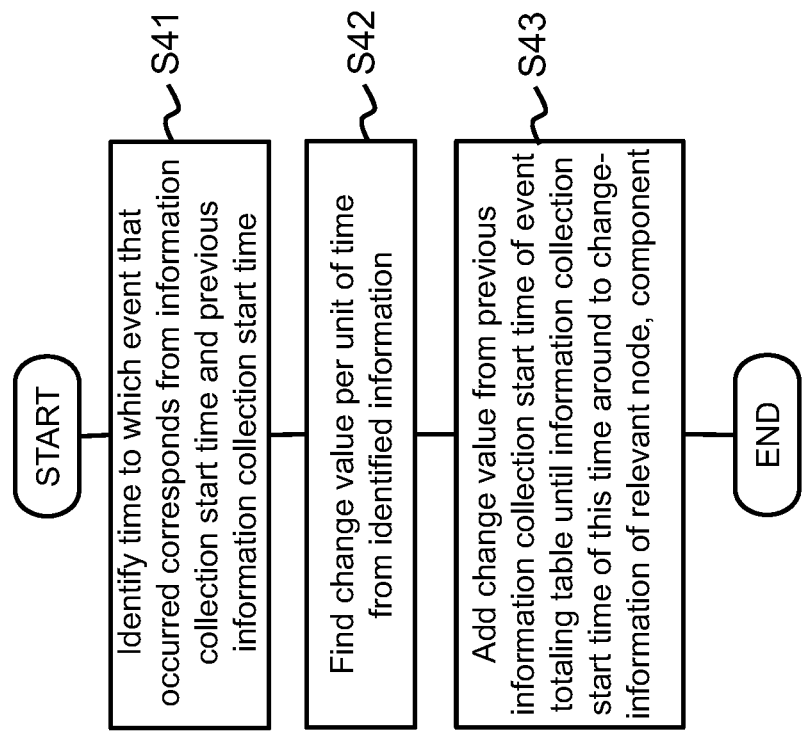

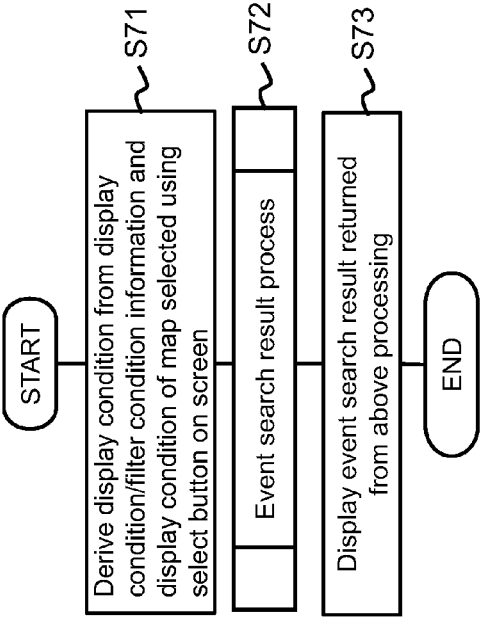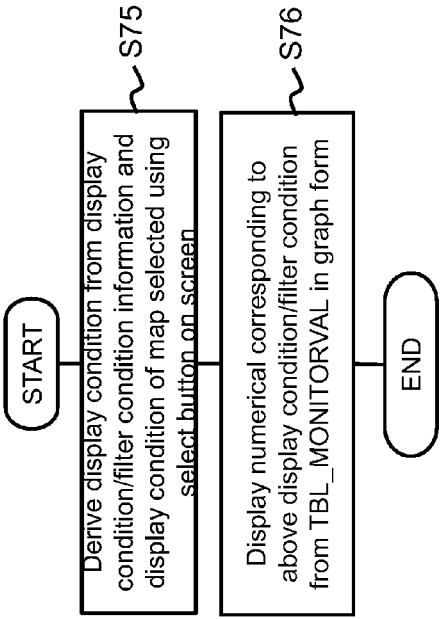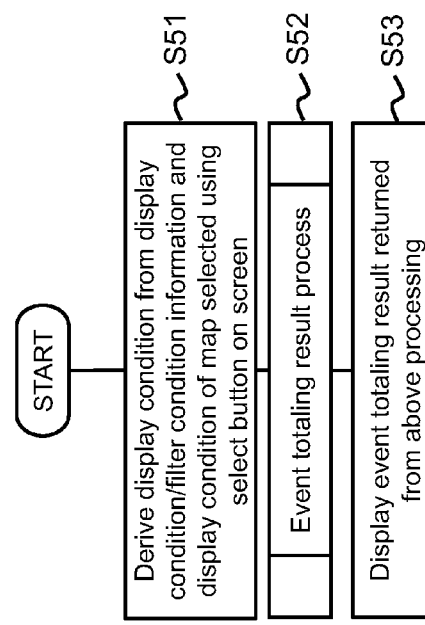

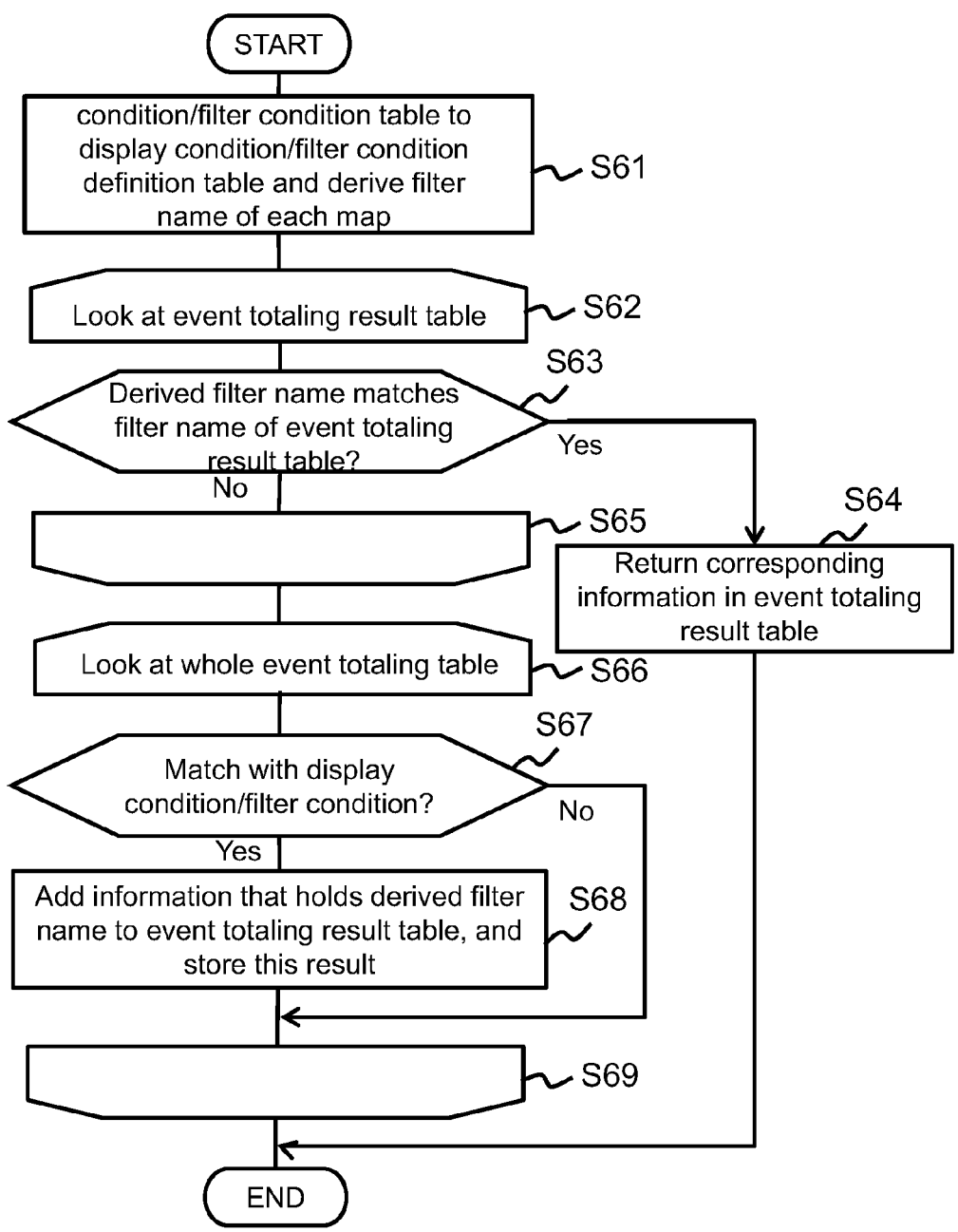

Fig. 29

Monitoring numeric value management table   TBL_MONITORVAL   139

| Information collection start time | Node ID | Component ID | Monitoring numeric value type | Monitoring numeric value |
|---|---|---|---|---|
| 2010/6/8 18:20 | Server1 | CPU1 | CPU utilization | 100% |
| 2010/6/8 18:20 | Storage1 | LU1 | Data traffic | 10Bytes/sec |
| 2010/6/8 18:20 | FC-Switch1 | FC-Switch1/Port1 | Communication volume | 10MBytes/sec |
| 2010/6/8 18:05 | Server1 | CPU1 | CPU utilization | 30% |
| 2010/6/8 18:05 | Storage1 | LU1 | Data traffic | 8Bytes/sec |
| 2010/6/8 18:05 | FC-Switch1 | FC-Switch1/Port1 | Communication volume | 8MBytes/sec |
| 2010/6/8 18:05 | Server2 | - | Temperature | 45 degrees C |
| : | : | : | : | : |

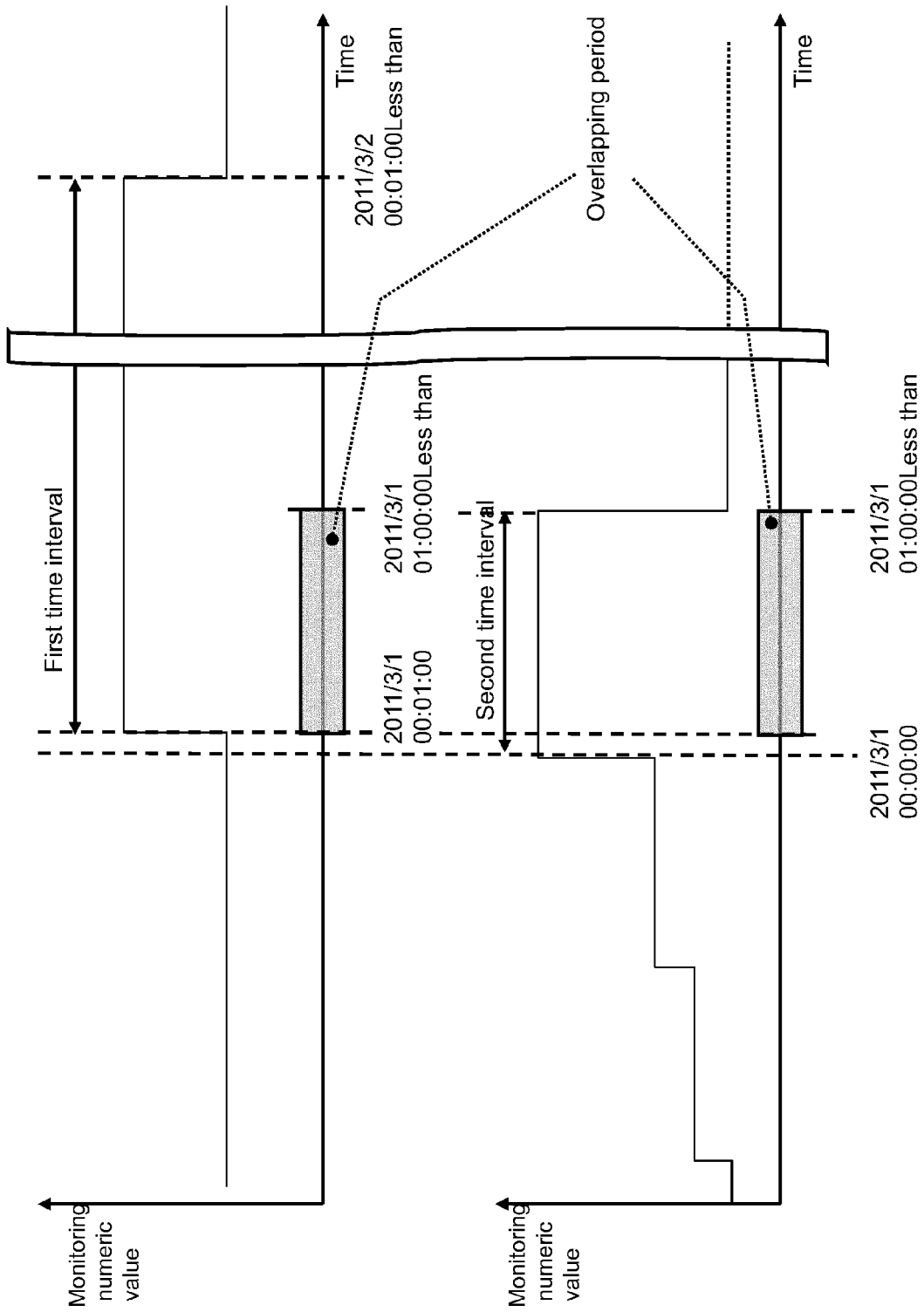

MONITORING SYSTEM AND MONITORING METHOD

TECHNICAL FIELD

The present invention relates to a monitoring system and a monitoring method for monitoring apparatuses coupled via a network.

BACKGROUND ART

Heretofore, computer systems in which multiple host computers and a storage system were coupled to a communication network have been constructed. A monitoring system is generally disposed in a computer system like this. The monitoring system monitors the various apparatuses coupled to the network.

For example, technology for collecting and storing the performance of monitoring-target apparatuses coupled to a network is known (Patent Literature 1). Furthermore, displaying the collected performance values of the monitoring-target apparatuses in graph form is also known.

CITATION LIST

Patent Literature

[PTL 1]
U.S. Pat. No. 7,143,008

SUMMARY OF INVENTION

Technical Problem

According to the above-mentioned art, a monitoring-target apparatus can be appropriately monitored by displaying the performance values of the monitoring-target apparatus in graph form. However, simply graphing performance values makes it difficult to grasp a change in configuration or a change in status in the actual computer system.

Solution to Problem

To solve for the above problem, a monitoring system quantifies either a change of configuration or a change of status of a monitoring target (refers to either a monitoring-target apparatus or a component of the monitoring-target apparatus) and displays the value of this change.

Furthermore, change value displays, for example, are as follows (However, the two do not need to be realized at the same time).

(1) A change value is computed for each of multiple monitoring targets and displayed on a screen. This makes it possible to easily grasp changes in configuration and changes in status in multiple monitoring targets. Also, the relevant change values may be displayed chronologically using a graph that has a time sequence axis. In accordance with this, the temporal trends of multiple monitoring-target changes can be discerned using a single screen.

(2) A timeline of change values is displayed on the same screen as a chronological graph of monitoring-target measurement numeric values using a graph that has a time sequence axis. This makes it easy to analyze the measurement numeric values while taking into account a change in configuration or status.

BRIEF DESCRIPTION OF DRAWINGS

FIG. 6 is a block diagram of a polling timer table related to the example.

FIG. 7 is a block diagram of a configuration information management table with respect to a node related to the example.

FIG. 8 is a block diagram of a configuration information management table with respect to a component related to the example.

FIG. 9 is a block diagram of a group table related to the example.

FIG. 10 is a block diagram of an event table related to the example.

FIG. 11 is a block diagram of an event totaling table related to the example.

FIG. 13 is a block diagram of an event totaling result table related to the example.

FIG. 14A is a block diagram of an event search result table related to the example. FIG. 14B is a block diagram of a change type table related to the example. FIG. 14C is a block diagram of duration A table.

FIG. 20A is a flowchart of a DB storage process related to the example. FIG. 20B is a flowchart of an event creation process related to the example.

FIG. 21 is a flowchart of an event totaling process related to the example.

FIG. 22A is a flowchart of an event map display process related to the example. FIG. 22B is a flowchart of an event display process related to the example. FIG. 22C is a flowchart of a monitoring numeric value display process related to the example.

FIG. 23 is a flowchart of an event totaling result process related to the example.

FIG. 29 is a block diagram of a monitoring numeric value management table related to the example.

FIG. 30 is a diagram showing an example of the relationship between a time interval and an overlapping period.

DESCRIPTION OF EMBODIMENT

Figure 1:
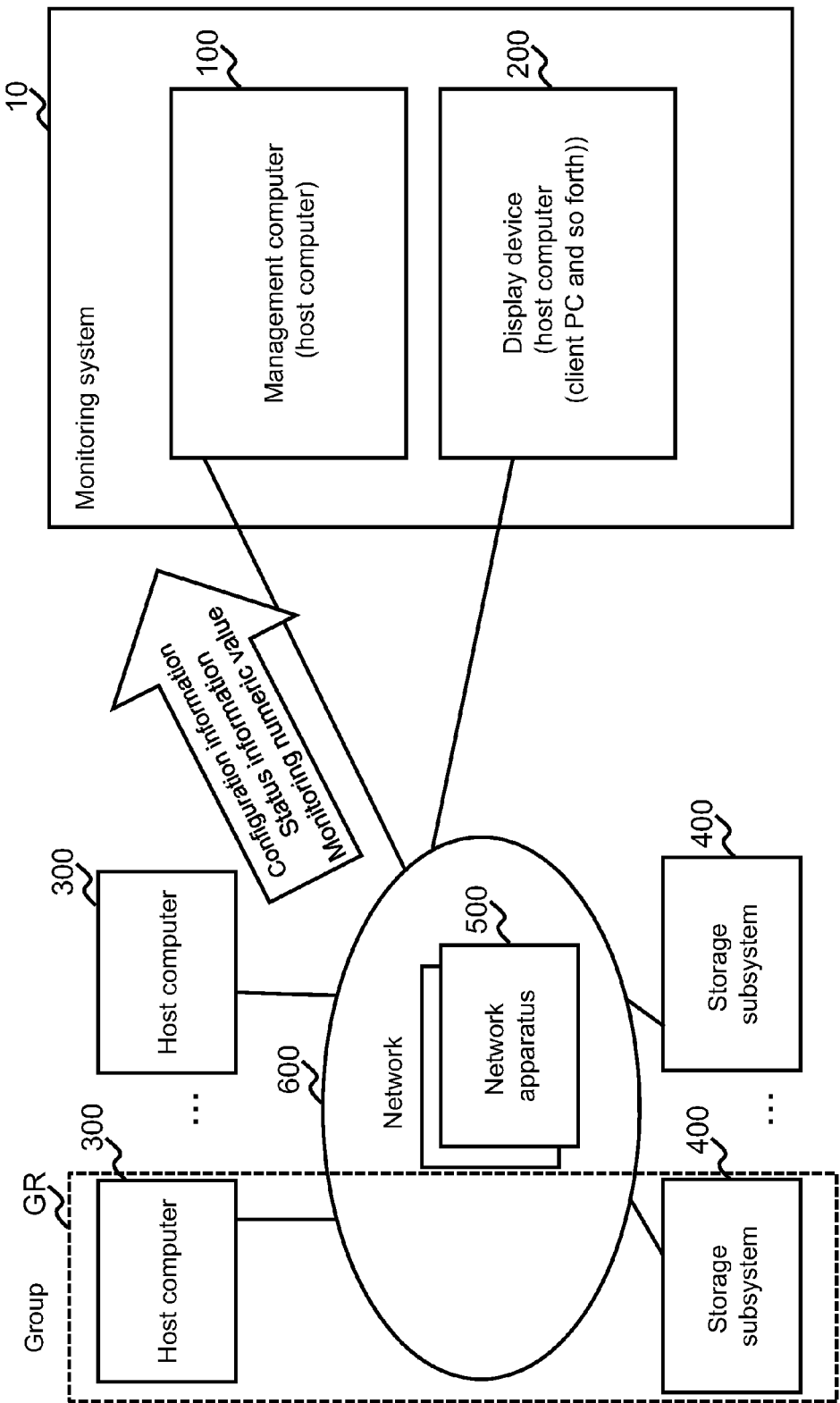
FIG. 1 is a block diagram of a computer system related to an example.

An example will be explained by referring to the drawings. Furthermore, the example explained hereinbelow does not limit the invention set forth in the claims, and all of the elements and combinations thereof described in the example are not necessarily essential as means of the invention for solving the problem.

Furthermore, in the following explanation, various types of information may be explained using the expression "xxx table", but the various information may also be expressed using a data structure other than a table. To show that the various information is not dependent on the data structure, "xxx table" can be called "xxx information".

Furthermore, in the following explanation, there may be cases where the processing is explained using a "program" as the doer of the action, but since the stipulated processing may be performed in accordance with a program being executed by a processor included in a controller (for example, a CPU (Central Processing Unit)) while using a storage resource (for example, a memory) and/or a communication interface device (for example, a communication port) as needed, the doer of the processing may also be the processor. Processing explained using the program as the doer of the action may be processing carried out by the processor or a management system comprising this processor (for example, a display device (client) or a management computer (a server)). Furthermore, the controller may be the processor itself or may comprise a hardware circuit that carries out either part or all of the processing performed by the controller. A program may be installed in respective controllers from a program source. The program source, for example, may be either a program delivery server or a storage medium.

Furthermore, a management computer comprises input/output devices. Examples of input/output devices may include a display, a keyboard, and a pointer device, but the input/output device may also be a device other than these. Also, as an alternative to an input/output device, a serial interface or an Ethernet interface (Ethernet is registered trademark) may be used as an input/output device and a display device comprising a display, a keyboard, or a pointer device may be coupled to the relevant interface, and by sending display information to the display device and receiving input information from the display device, the display device may substitute for the display and input of the input device by receiving input and carrying out a display.

Hereinafter, a set of one or more computers for managing a computer system may be called a monitoring system. In a case where the management computer displays display information, the management computer is the monitoring system. A combination of a management computer and a display device is also a monitoring system. Furthermore, processing equivalent to that of the management computer may be realized using multiple computers to increase speed and heighten reliability, and in this case, the relevant multiple computers (to include the display device when the display device performs displays) are the monitoring system.

Furthermore, in the following explanation, an apparatus and the parts, devices, and programs included in an apparatus will be called components. In addition, either an apparatus or a component that is to be specified as a target for monitoring will be called a monitoring target.

Furthermore, information, which the monitoring system acquires from the monitoring target for apparatus monitoring will be called monitoring information. Anyone or more of the following are included in the monitoring information.

Configuration information: For example, the identification information, mounting location, and settings of an apparatus or a component. More specific examples of types of configuration information are an IP address, an apparatus serial number, a network card identifier, a mounting location on a PCI bus, and component model information.

Status information: The status of an apparatus or a component. A more specific example of a type of status information is the presence or absence of a component failure. Furthermore, the temperature of a fan or other such physical component may also be treated as status information (especially a case where a prescribed identifier and a temperature are compared) in that it can lead to an apparatus failure. However, temperature may also be treated as a measurement numeric value, which will be described further below. In a similar vein, a numerical value denoting the load of a component is also status information (For example, CPU utilization and memory usage. This is because a rise in the percentages of these numerical values constitutes a malfunction approximating a failure.)

Measurement numeric value: A numeric value that is measured having an apparatus or a component as the target. More specific examples of types of measurement numeric values may be CPU utilization, memory utilization (or usage), and disk utilization (or usage), or IOPS, or transmission bandwidth, communication bandwidth, communication latency, and the number of processes per unit of time of an application program.

FIG. 1 is a block diagram of a computer system related to the example.

The computer system comprises a monitoring system 10, a host computer 300 as an example of a monitoring-target apparatus, and a storage subsystem 400 as an example of a monitoring-target apparatus. There may be one or multiple of each of the host computer 300 and storage subsystem 400 in the computer system. The monitoring system 10, for example, comprises a management computer 100 comprising a host computer, and a display device 200 comprising either a host computer or a client PC or the like.

The monitoring system 10, the host computer 300 and the storage subsystem 400 are coupled via a network (for example, a LAN (Local Area Network)) 600. The network 600 comprises a network apparatus 500, such as an IP (Internal Protocol) switch. Furthermore, the network apparatus 500 is also an example of a monitoring-target apparatus.

In this computer system, the management computer 100 of the monitoring system 10 collects monitoring numeric values, status information, and configuration information from the host computer 300, storage subsystem 400, or network apparatus 500, which are examples of monitoring-target apparatuses, as examples of monitoring information. Furthermore, in the system of FIG. 1, examples of the monitoring numeric value, status information and configuration information are as follows.

In a case where the network apparatus 500 is an IP switch, the status information, for example, includes a normal status, which is a state in which the IP switch port is normal, an alert status, which is a state in which an alert is required, an emergency status, which requires emergency action, and a link down status denoting that a link has gone down.

The monitoring numeric value, for example, is information with respect to component performance, such as traffic and usage. For example, in a case where the network apparatus 500 is an IP switch, the monitoring numeric value includes the network traffic and quantity of sent packets of the IP switch port. Furthermore, CPU usage is a monitoring numeric value of the host computer 300.

The configuration information, for example, is information with respect to configurations such as the version and name of a node (a monitoring-target apparatus such as a host computer 300, a storage subsystem 400, and a network apparatus 500) or a component. For example, in a case where the network apparatus 500 is an IP switch, the configuration information is the names of the port and power source configuring the IP switch.

The display device 200 receives information for display from the management computer 100, and displays a monitoring screen with respect to the performance, status, and configuration of the monitoring-target apparatus.

Furthermore, in the following explanation, the acquisition of monitoring information in accordance with the management computer 100 will be called polling. The process for acquiring monitoring information is performed by sending an information acquisition request to the monitoring-target apparatus. However, at least a portion of the monitoring information may be acquired using a process other than polling.

Furthermore, even in a case where the acquisition of monitoring information is performed using polling, not all monitoring targets are necessarily acquired at the same time interval due to any of the following reasons.

(1) A case in which the management computer 100 cannot adhere to the interval due to load.

(2) A case in which polling was additionally executed outside to the fixed interval in accordance with a user instruction.

(3) Each specific type of configuration information tends to change less than the specific information that belongs to either the status information or the measurement numeric value. For this reason, a case in which the polling interval of the configuration information was prolonged more than the polling intervals of the status information and the measurement numeric value in order to lessen the polling load of the management computer 100, the network, or the monitoring target, or reduce the costs in a case where configuration information is held in a history.

(4) There may also be a case in which changes in the configuration, status, and measurement numeric value of an identified apparatus or component are more moderate than in another apparatus or component even for types of information other than those of (3) above. In accordance with this, there may also be a case in which a long polling interval is employed similar to that of (3) with respect to the moderate-change apparatus or component.

Furthermore, in a case where a change in the configuration or status of a monitoring target is identified in accordance with polling, this change is identified as having occurred between the time (the time interval) that polling identified the change and the time of the previous polling when the change could not be identified. The change value of this example is characterized in that the absolute value of the value diminishes the longer this time interval is, showcasing the fact that a change that occurred during a shorter acquisition time interval is more beneficial from the standpoint of analysis. This is especially beneficial when comparing and analyzing a change value and a chronological change in a measurement numeric value. However, the relationship between the above-described time interval and the change value is useful even in a case where chronological changes are not analyzed. For example, this suggests that comparing the change values of multiple monitoring targets during a certain time period is likely to reveal that a monitoring target change having a small change value occurred a relatively long time ago.

Furthermore, as one example of this, in the following explanation a case in which the polling interval changes in accordance with the type of monitoring information will be explained, but it goes without saying that the present invention can also be applied in a case where the polling interval changes for reasons other than the type of the monitoring information.

Figure 2:
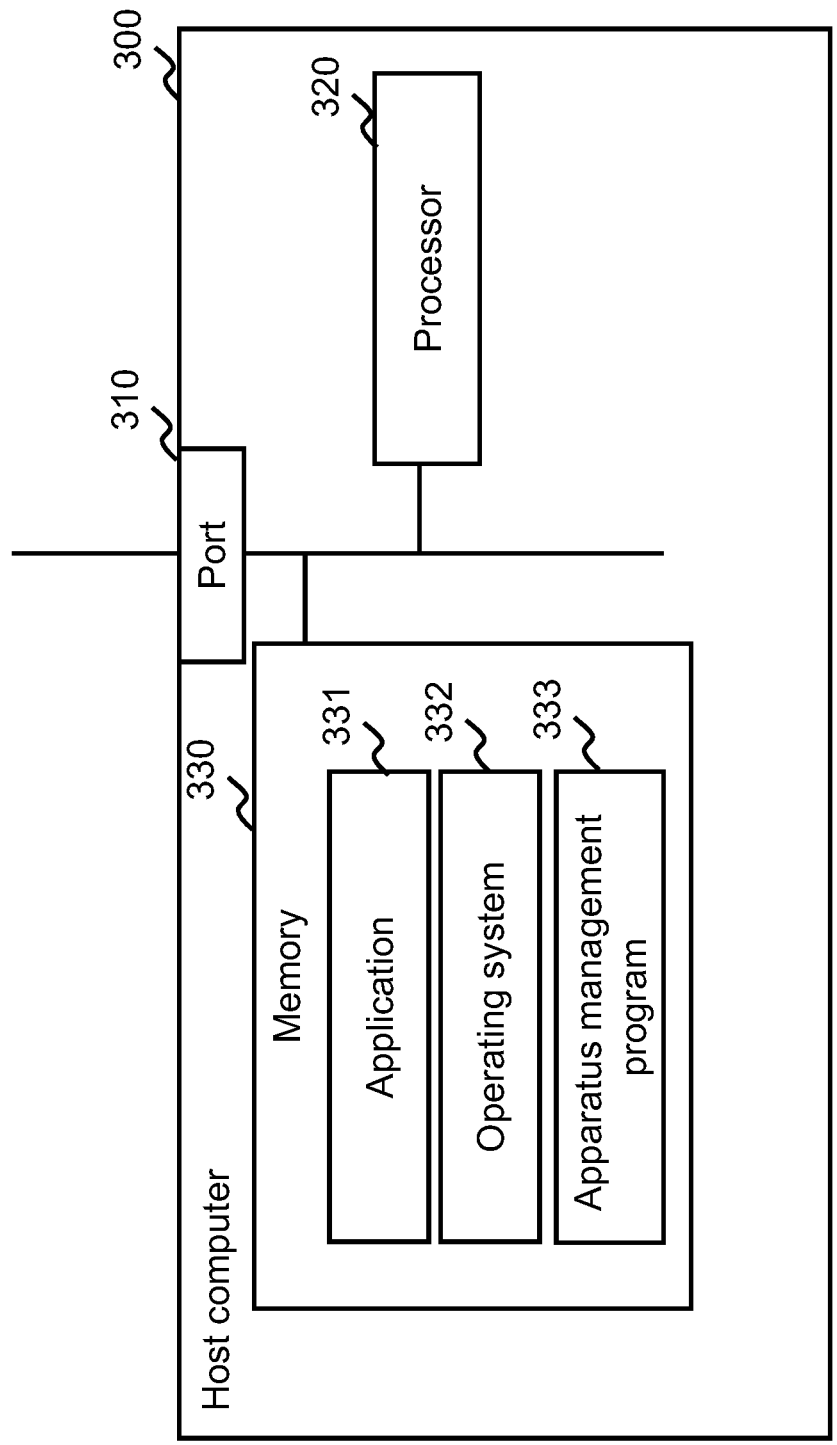
FIG. 2 is a block diagram of a host computer related to the example.

FIG. 2 is a block diagram of a host computer related to the example.

The host computer 300 comprises a port 310, a processor 320, and a memory 330. The port 310 mediates communications via the network 600. The memory 330 stores a program executed by the processor 320 and information needed by the processor 320. In this example, the memory 330 stores such programs as an application 331, an operating system 332, and an apparatus management program 333. The apparatus management program 333 is for sending host computer 300 configuration information, a monitoring numeric value, and status information to the management computer 100. The processor 320 executes various processes by executing a program stored in the memory 330. For example, in accordance with executing the apparatus management program 333, the processor 320, upon being polled by the management computer 100, sends the information (monitoring information: configuration information, monitoring numeric value, or status information) of the host computer 300 requested in the polling to the management computer 100 via the port 310.

Figure 3:
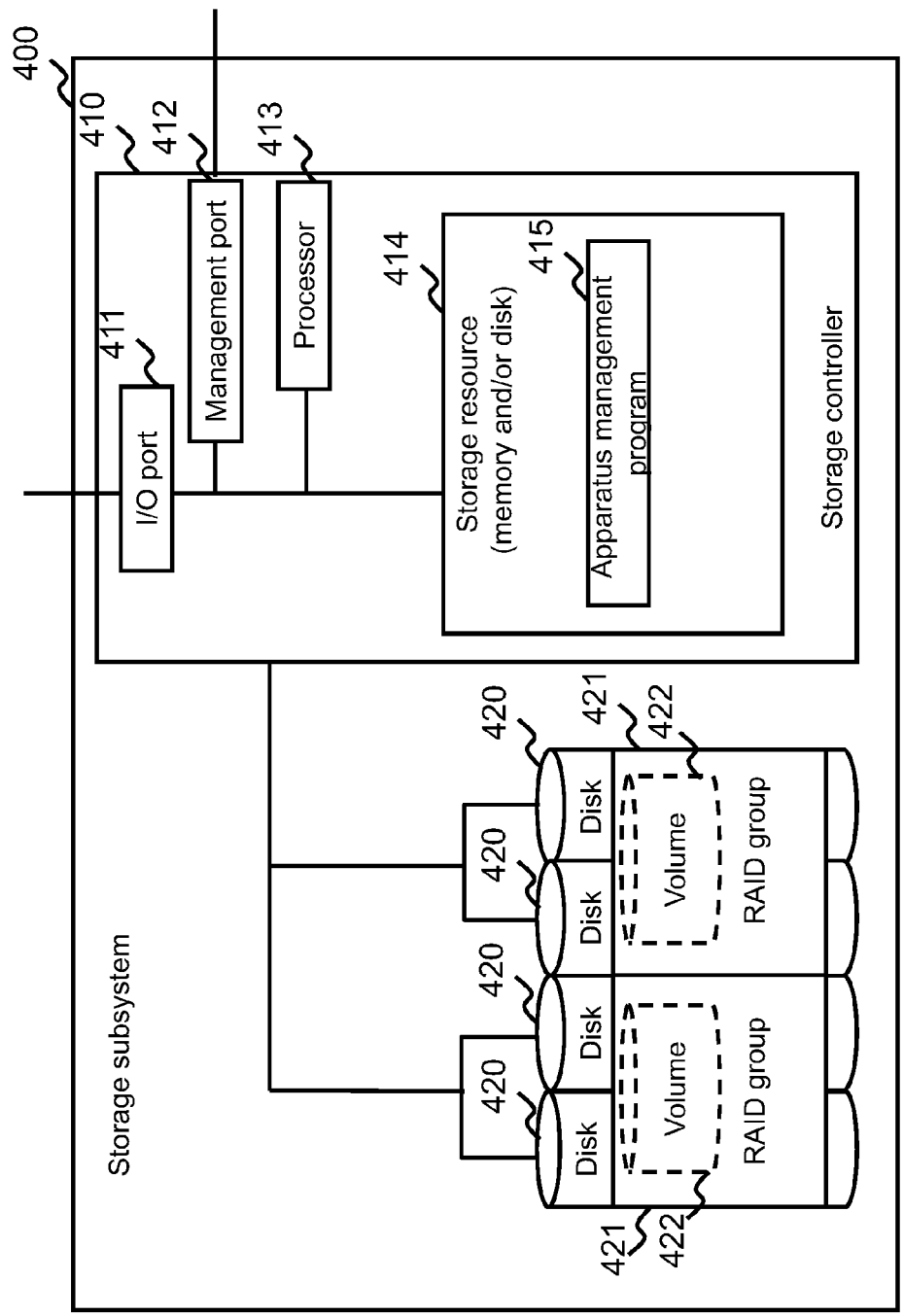
FIG. 3 is a block diagram of a storage subsystem related to the example.

FIG. 3 is a block diagram of a storage subsystem related to the example.

The storage subsystem 400 comprises a storage controller 410, and multiple disk devices 420.

The storage controller 410 comprises an I/O port 411, a management port 412, a processor 413, and a storage resource 414 comprising a memory and/or a disk device. The I/O port 411 mediates communication with the host computer 300 and so forth via the network 600. The management port 412 mediates communications with the management computer 100 via the network 600. The storage resource 414 stores a program to be executed by the processor 413, and information needed by the processor 413. In this example, the storage resource 414 stores a program such as an apparatus management program 415. The apparatus management program 415 is for sending the configuration information, monitoring numeric value, and status information of the storage subsystem 400 to the management computer 100. The processor 413 executes various processes in accordance with executing a program stored in the storage resource 414. For example, in accordance with executing the apparatus management program 415, the processor 413, upon being polled from the management computer 100, sends the information (the configuration information, the monitoring numeric value, or the status information) of the storage subsystem 400 requested in the polling to the management computer 100 via the management port 412.

In this example, a RAID (an abbreviation of Redundant Array of Independent (or Inexpensive) Disks) group 421 is configured using the storage areas of multiple disk devices 420. The storage area of the RAID group 421 is allocated as a storage area of a volume 422.

The storage subsystem 400 may comprise a storage device (for example, a flash memory drive) comprising another type of storage media either in addition to the disk device 420 or instead of the disk device 420.

Figure 4:
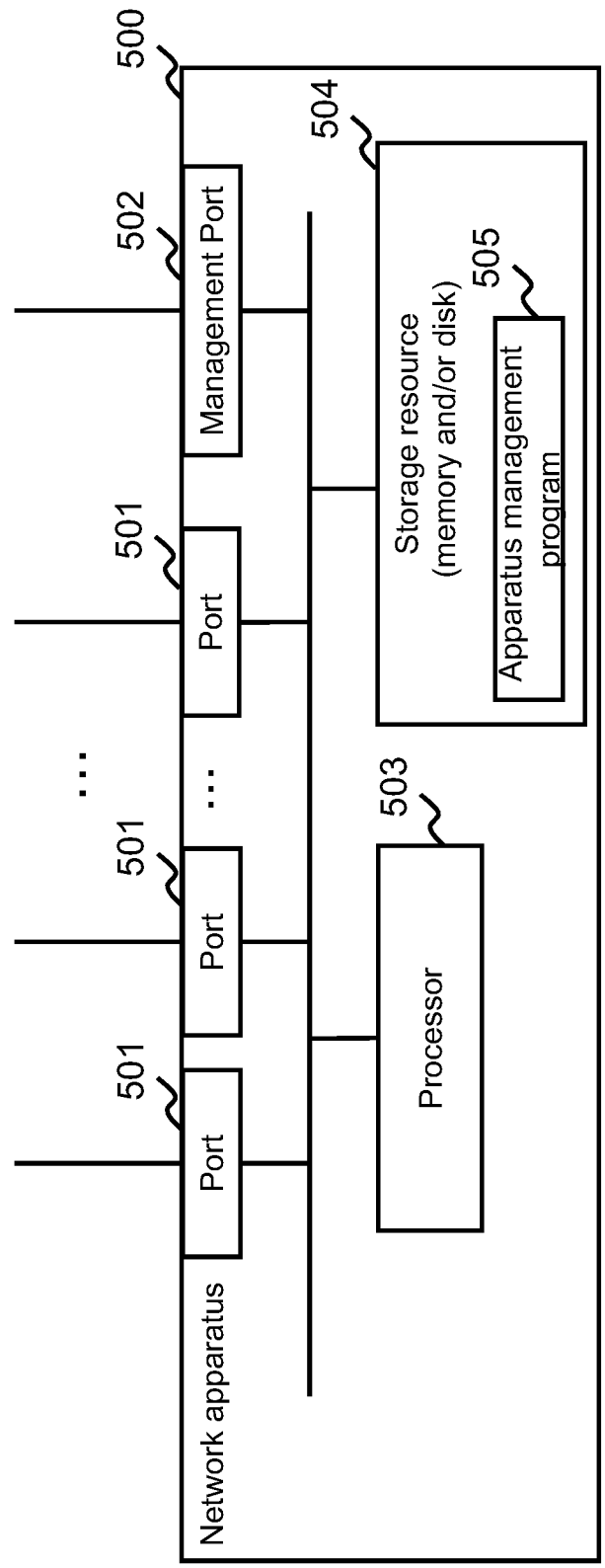
FIG. 4 is a block diagram of a network apparatus related to the example.

FIG. 4 is a block diagram of a network apparatus related to the example.

The network apparatus 500, for example, is an IP switch, and comprises multiple ports 501, a management port 502, a processor 503, and a storage resource 504 comprising a memory and/or a disk device.

The port 501 mediates communications with the host computer 300, the storage subsystem 400, and so forth via the network 600. The management port 502 mediates communications with the management computer 100 via the network 600. The storage resource 504 stores a program to be executed by the processor 503, and information needed by the processor 503. In this example, the storage resource 504 stores a program such as an apparatus management program 505. The apparatus management program 505 is for sending the configuration information, monitoring numeric value, and status information of the network apparatus 500 to the management computer 100. The processor 503 executes various processes in accordance with executing a program stored in the storage resource 504. For example, in accordance with executing the apparatus management program 505, the processor 503, upon being polled from the management computer 100, sends the information (the configuration information, the monitoring numeric value, or the status information) of the network apparatus 500 requested in the polling to the management computer 100 via the management port 502. Furthermore, the monitoring-target apparatus may send the monitoring information from a port other than the management port.

Figure 5:
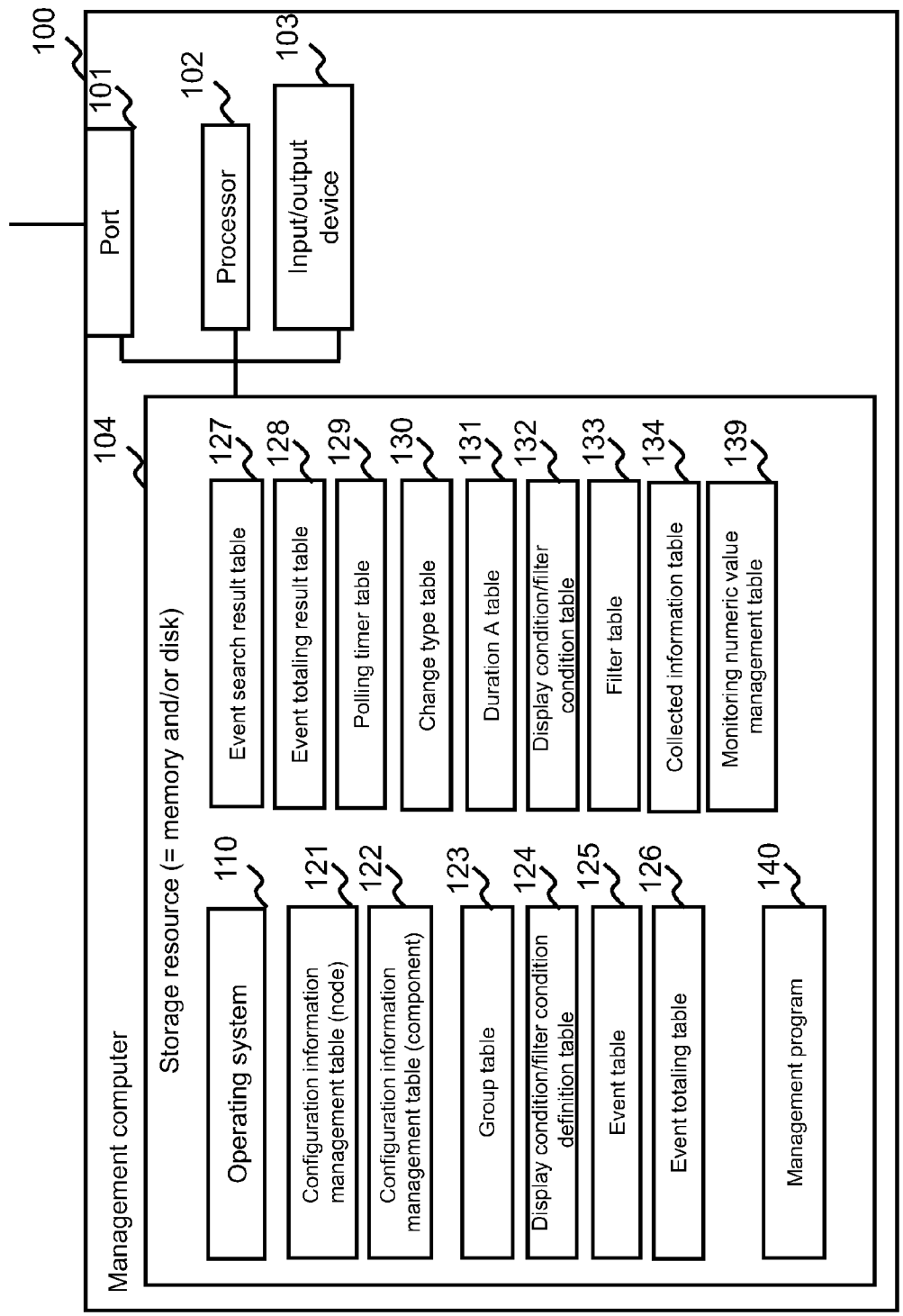
FIG. 5 is a block diagram of a management computer related to the example.

FIG. 5 is a block diagram of a management computer related to the example.

The management computer 100 comprises a port 101, a processor 102, an input/output device 103, and a storage resource 104 comprising a memory and/or a disk device.

The port 101 mediates communications with multiple monitoring-target apparatuses (the host computer 300, the storage subsystem 400, the network apparatus 500, and so forth) via the network 600. The input/output device 103, for example, comprises an input device such as a mouse or a keyboard, and an output device (a display device) such as a liquid crystal display, and in addition to receiving an input from the operator of the management computer 100, also displays and outputs information to the operator.

The storage resource 104 stores a program to be executed by the processor 102, and information needed by the processor 102. In this example, the storage resource 104 stores programs such as an operating system 110 and a management program 140. The management program 140 is for collecting the configuration information, monitoring numeric value, and status information of the monitoring-target apparatus (node) and/or a constituent part of the monitoring-target apparatus (a component), and displaying a monitoring screen comprising a graph and information related to the configuration, performance and status of the monitoring-target apparatus on the display device 200.

Furthermore, the computer resource 104 stores a configuration information management table (node) 121, a configuration information management table (component) 122, a group table 123, a display condition/filter condition definition table 124, an event table 125, an event totaling table 126, an event search result table 127, an event totaling result table 128, a polling timer table 129, a change type table 130, a duration A table 131, a display condition/filter condition table 132, a filter table 133, a collected information table 134, and a monitoring numeric value management table 139. The collected information table 134 correspondingly stores information for identifying a monitoring target, information for identifying the type of monitoring numeric value of the monitoring-target apparatus, monitoring numeric value collected from the monitoring target, and a collected time(s). For example, the collected information table 134 correspondingly stores information for identifying the CPU of the monitoring-target apparatus, information denoting the CPU utilization, which is an example of the monitoring numeric value of the monitoring-target apparatus, the value of the monitoring numeric value (the value of the CPU utilization), and the time at which polling started.

The processor 102 executes various processes in accordance with executing a program stored in the storage resource 104. For example, the processor 102 executes a monitoring process of the monitoring-target apparatus by executing the management program 140 and using the respective tables 121 through 134 and 139.

FIG. 6 is a block diagram of the polling timer table related to the example.

The polling timer table (TBL_POLLING) 129 is for managing the time for executing a polling for collecting information with respect to the respective monitoring-target apparatuses.

The polling timer table 129 comprises an information type, an interval, and a next information collection start time. The information type is the type of information to be acquired during polling, and in this example, is status information, a monitoring numeric value, and configuration information. The interval is the interval during which polling is executed for acquiring the information of the corresponding type. In this example, the settings are configured such that polling is executed during a 15-minute interval for status information, polling is executed during a 5-minute interval for monitoring numeric value, and polling is executed during a one-day interval for configuration information. That is, in this example, the settings are configured such that polling is carried out at different time intervals for the status information, the monitoring numeric value, and the configuration information. This is because at least one of the frequency required for each type of information, the average time after some kind of change occurred until some kind of change is expected to occur next, and the size of each type of information will differ in accordance with the type of information, i.e., the status information, the monitoring numeric value, and the configuration information. The next information collection start time is the time when the next polling for collecting information will start.

FIG. 7 is a block diagram of the configuration information management table for a node related to the example.

The configuration information management table for a node (monitoring-target apparatus) (TBL_NODE) 121 comprises a node ID, a node type, a node name, an IP address, authentication information (ID/password), an information collection start time, and a group ID.

The node ID is an identifier for uniquely identifying a node. The node type is the type of the node. As the node types, for example, there are a server (SERVER), a storage (STORAGE), and a fibre channel switch (FC-Switch). The node name is the name given to the node. The IP address is the IP address allocated to the node. The information collection start time is the polling start time when collecting this information (the information collection start time). The group ID is a unique identifier for a group comprising multiple nodes. Using a group makes it possible to use multiple nodes in the unit of a group in various processing.

For example, according to the first record of this drawing, it is clear that with regard to a node with a node ID of "Server1" the node type is "SERVER", the node name is "Server1", the IP address is "111.112.113.101", the authentication information ID is "Administrator", the password is "AdminPW1", the polling start time when this information was collected is "2010/6/8 18:20", and the relevant node group ID is "Server1".

FIG. 8 is a block diagram of a configuration information management table for a component related to the example.

The configuration information management table for a component (TBL_COMPO) 122 comprises a component ID, a component type, a component name, and a parent node ID.

The component ID is an identifier for uniquely identifying a component (constituent part) comprising a node. The component type is the type of the component. As the component types there are a LAN adapter (LAN_ADAPTER), a ISCSI disk (ISCSI_DISK), an application (APPLICATION), a file system (FILE_SYSTEM), a storage disk (STORAGE_DISK), a storage volume (STORAGE_VOLIME), a storage logical unit (STORAGE_LU) and a fibre channel port (FC_PORT). The component name is the name given to the component. The parent node ID is an identifier of a node that constitutes the parent of the corresponding component.

For example, according to the first record of this drawing, it is clear that regarding a component with a component ID of "Server1/LAN_Adapter1", the type is "LAN_ADAPTER", the component name is "LAN_Adapter1", and the parent node ID is "Server1".

FIG. 9 is a block diagram of a group table related to the example.

The group table 123 (GRP_NODE) is for managing a group of monitoring-target apparatuses. The group table 123 comprises a group ID, a group name, and a node name.

The group ID is an identifier for uniquely identifying a group. The group name is the name given of the group. The node name is the name of a node that belongs to the corresponding group.

For example, according to the first record of this drawing, it is clear that regarding a group with the group ID "Server1", the group name is "SERVER1", and the nodes Server1, Server2, and Server3 belong to the group.

FIG. 10 is a block diagram of an event table related to the example.

The event table 125 (TBL_EVT) is a table for managing an event such as a configuration change or a status change, which occurred between the time subsequent to when the previous information was collected and the point in time at which this information was collected. The event table (TBL_EVT) 125 comprises an event ID, a node ID, a component ID, an event or status type, a previous information collection start time, a category, an information collection start time, a node change type, and a component change type.

The event ID is an identifier for uniquely identifying an event. The node ID is an identifier of the node related to the corresponding event. The component ID is the identifier of the component related to the corresponding event. The event or status type is either the type or status of the corresponding event. The previous information collection start time is the time at which the collection of information corresponding to the relevant event started previously (reference time of previous acquisition). The category is the type of information that has been collected. Therefore, the category, for example, can be taken to mean configuration or status, but can also to taken as the value of the monitoring numeric value. The information collection start time is the time at which this collection of information started (reference time of this acquisition). The node change type is the change type with respect to the node. The change types include changed, which denotes that the node was changed, added, which denotes that the node was added, and removed, which denotes that the node was removed. The component change type is the change type with respect to the component. The change types include changed, which denotes that the component was changed, added, which denotes that the component was added, removed, which denotes that the component was removed, and unchanged (Not changed), which denotes that a component change has not been made.

FIG. 11 is a block diagram of an event totaling table related to the example.

The event totaling table 126 (TBL_EVTTOTAL) comprises a time, a change value, a node change type, a component change type, a node ID and a component ID.

The node change type is the change type with respect to the node. The component change type is the change type with respect to the component. The node ID is the node identifier. The component ID is the component identifier. The change value is the value obtained by converting the number of change events corresponding to the type of change in the component of the corresponding node to the quantity (change value) of a prescribed unit of time shown by the relevant time (in this example, the unit of time, for example, is one minute). In this example, the change value here is obtained by dividing the number of events by the duration during which the event is believed to have occurred (the polling interval, or more specifically, the duration between the previous information collection start time and the information collection start time of this time around). However, the conversion process for finding this change value is an example. A change value corresponding to the number of events is associated with each prescribed unit of time during the polling interval and stored in this event totaling table 126. That is, a value related to the occurrence of an event can be managed as a unit of time that is shorter than the polling interval. This makes it possible to appropriately display an event occurrence graph for a shorter duration of time than the polling interval by using a record of this event totaling table 126.

For example, according to the first record of the same drawing, it is clear that 0.01 is the change value of an added (Added) event for a component with the component ID of "Server2/Application1" of a node with the node ID of "Server2" at a unit of time denoted by "6/8 18:10".

Figure 12:
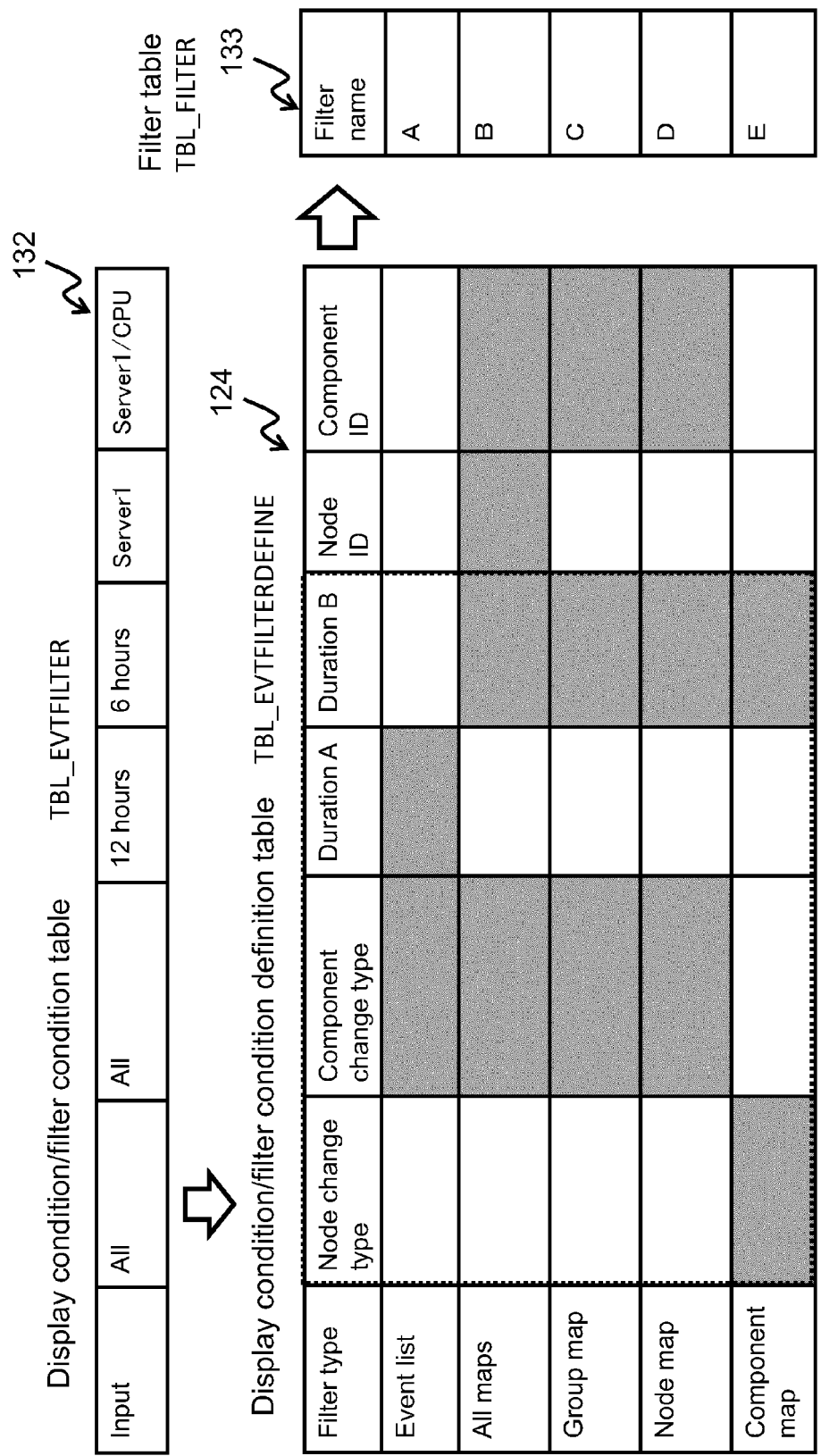
FIG. 12 is a block diagram of a display condition/filter condition table, a display condition/filter condition definition table, and a filter table related to the example.

FIG. 12 is a block diagram of a display condition/filter condition table, a display condition/filter condition definition table, and a filter table related to the example.

The display condition/filter condition table 132 (TBL_EVTFILTER) stores a display condition and a filter condition selected using a monitoring screen on the display device 200. Configurable conditions include a node ID, a component ID, a node change type, a component change type, a duration A, and a duration B (target duration). Duration A is the entire length of the time axis of a graph displayed on the monitoring screen, and duration B is a duration selected by the user within duration A. This same drawing shows that all the node change types have been targeted, all the component change types have been targeted, duration A is 12 hours, and duration B is 6 hours for a component with a component ID of "Server1/CPU" of a node with the node ID of "Server1".

The display condition/filter condition definition table 124 (TBL_EVTFILTERDEFINE) shows a filter for detecting a condition for searching each type of graph (map) displayed on the monitoring screen for an event needed to create the relevant map. A condition required for the search is displayed in white and a not-required condition is displayed in grey in this drawing. For example, as conditions for displaying an event list, there are the node change type, the duration B, the node ID and the component ID. Also, as conditions for displaying a node map, there are the node change type, the duration A, and the node ID.

The filter table 133 (TBL_FILTER) stores the name of a filter when applying a filter of the display condition/filter condition definition table 124 to the contents of the display condition/filter condition table 132. In this example, the content of the condition needed in each filter of the display condition/filter condition definition table 124 is fetched from the contents of the display condition/filter condition table 132 and combined to get a filter name. The filter name A with respect to the filter of the event list of the filter table 133 is "all, None, None, 6 hours, Server1, CPU" selected from the contents of the display condition/filter condition table 132 with respect to the node change type, the duration B, node ID, and component ID needed in the event list filter.

FIG. 13 is a block diagram of an event totaling result table related to the example.

The event totaling result table 128 (TBL_EVTTOTALRESULT) is for storing the filter name at the time that a search was conducted in accordance with the contents specified in the display condition/filter condition table 132, and the search result retrieved from the event totaling table 126 using the relevant filter.

The event totaling result table 128 comprises a filter name, a time, a change value, a node change type, a component change type, a node ID, and a component ID. The filter name is the filter name used when the search was conducted. The time, the change value, the node change type, the component change type, the node ID, and the component ID are values that have been totaled with respect to the event (event record) obtained from the event totaling table 126 using a search condition. In accordance with this event totaling result table 128, it is possible to appropriately manage records denoting a prescribed unit of duration for an event that matches a condition.

FIG. 14A is a block diagram of an event search result table related to the example. FIG. 14B is a block diagram of a change type table related to the example. FIG. 14C is a block diagram of a duration A table.

The event search result table 127 (TBL_EVTRESULT) is for storing an event, which matches a condition specified in the display condition/filter condition table 132, and which is likely to have occurred during the time specified by duration B. The event search result table 127 comprises an event ID, a node ID, a component ID, an event or status type, a previous information collection start time, a category, an information collection start time, a node change type, a component change type, and a probability. The event ID, the node ID, the component ID, the event or status type, the previous information collection start time, the category, the information collection start time, the node change type, and the component change type are the contents of an event record identified from the event table 125. The probability is the probability (occurrence probability) that the corresponding event will occur during duration B. In this example, the probability is the percentage of time, which makes up the duration during which an event is likely to have occurred, and in which the duration during which an event is likely to have occurred overlaps with duration B.

The change type table 130 (TBL_EVTPAT) stores selection candidates for a node change type and a component change type. The selection candidates may included "Any", which denotes that any node change type and component change type is all right, "Added node", which denotes that the node change type is an added node, "Removed node", which denotes that the node change type is a removed node, and "Changed node—Added component", which denotes that the node change type is a changed node, and, in addition, that the component change type is an added component.

The duration A table 131 (TBL_TIMEPAT) stores duration A selection candidates. The selection candidates include 1 hour, 6 hours, 12 hours, 24 hours, and 7 days.

FIG. 29 is a block diagram of a monitoring numeric value management table related to the example.

The monitoring numeric value management table 139 (TBL_MONITORVAL) comprises a time, a node ID, a component ID, a monitoring numeric value type, and a monitoring numeric value.

The time is the information collection start time. The node ID is the node identifier. The component ID is the component identifier. The monitoring numeric value type is the type of the monitoring numeric value. The monitoring numeric value is the monitoring numeric value.

Figure 15:
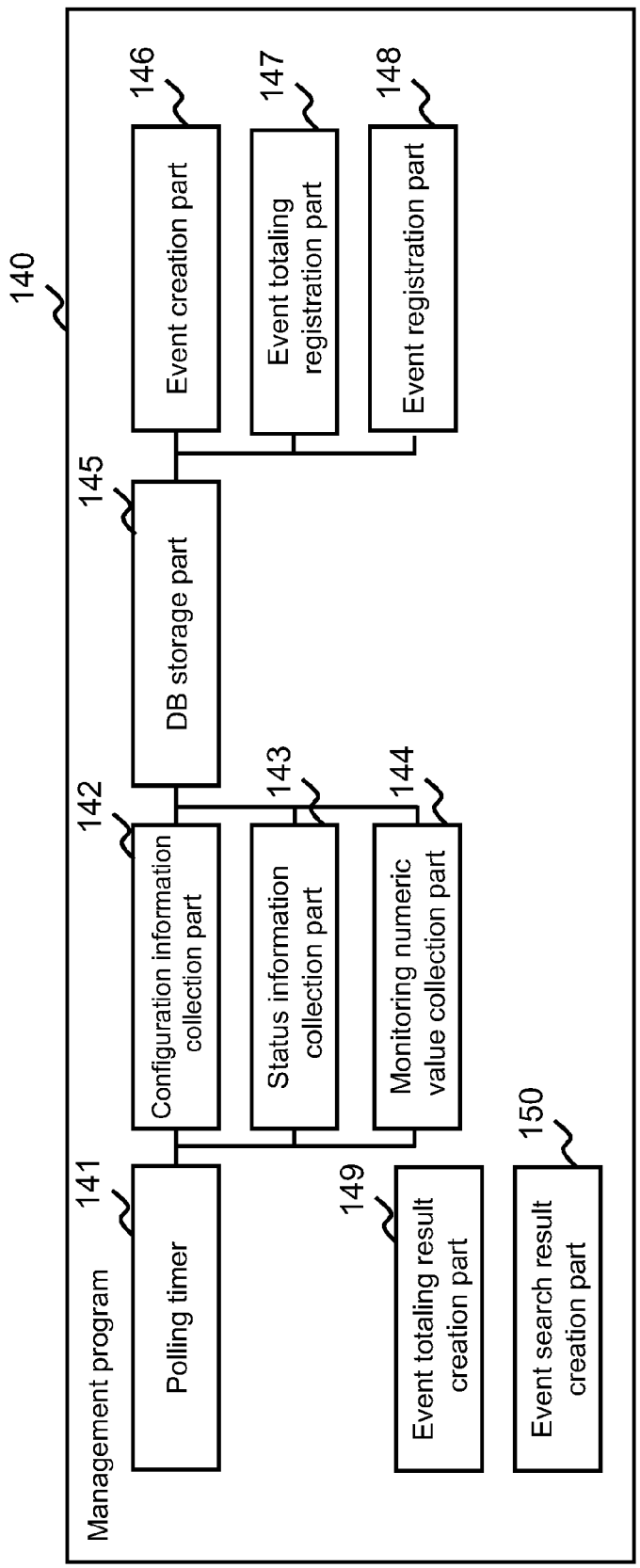
FIG. 15 is a block diagram of a management program related to the example.

FIG. 15 is a block diagram of a management program related to the example.

The management program 140 comprises a polling timer 141, a configuration information collection part 142, a status information collection part 143, a monitoring numeric value collection part 144, a DB storage part 145, an event creation part 146, an event totaling registration part 147, an event registration part 148, an event totaling result creation part 149, and an event search result creation part 150.

The polling timer 141 uses the polling timer table 129 to measure the time for starting the collection of the status information, the monitoring numeric value, and the configuration information, and notifies the configuration information collection part 142, the status information collection part 143, and the monitoring numeric value collection part 144. The configuration information collection part 142 collects configuration information from the monitoring-target apparatus. The status information collection part 143 collects status information from the monitoring-target apparatus. The monitoring numeric value collection part 144 collects a monitoring numeric value from the monitoring-target apparatus. The DB storage part 145 compares the various information that has been collected to the various information that was collected the previous time. The event creation part 146 executes an event creation process. The event creation process will be described further below. The event totaling registration part 147 executes an event totaling process. The event totaling process will be described further below. The event registration part 148 executes a process for registering an event created by the event creation part 146. The event totaling result creation part 149 executes an event totaling result process. The event totaling result process will be described further below. The event search result creation part 150 executes an event search result process. The event search result process will be described further below.

Figure 16:
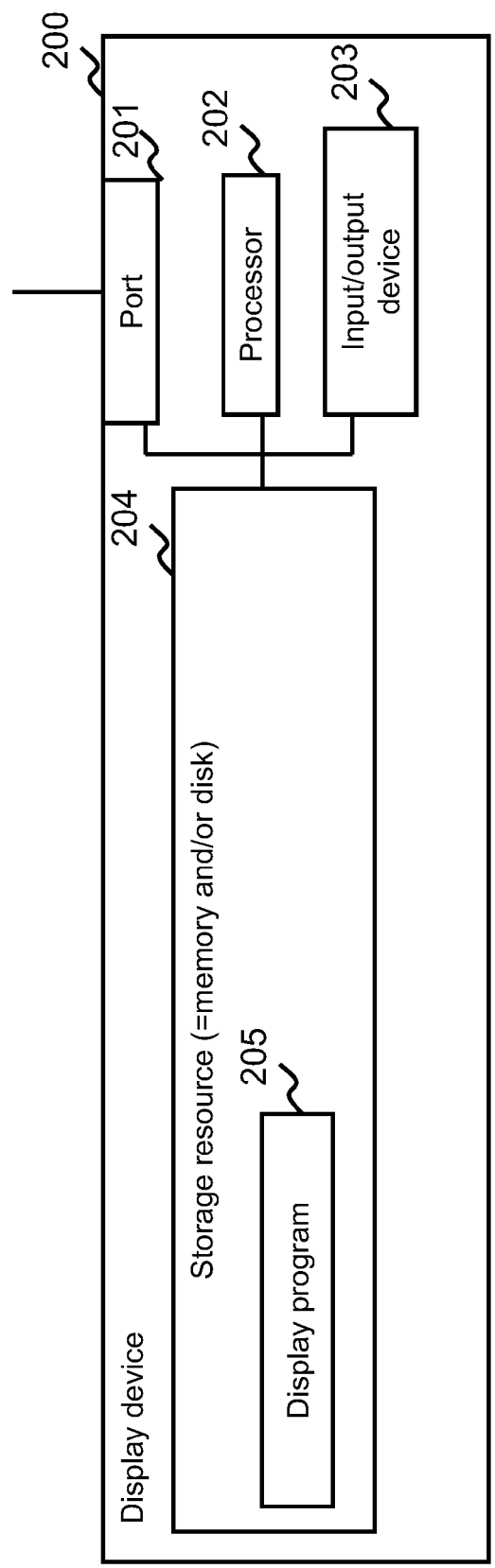
FIG. 16 is a block diagram of a display device related to the example.

FIG. 16 is a block diagram of a display device related to the example.

The display device 200 comprises a port 201, a processor 202, and a storage resource 204 comprising a memory and/or disk device.

The port 201 mediates communications with the management computer 100 via the network 600. The input/output device 203, for example, comprises an input device such as a mouse or a keyboard, and an output device such as a liquid crystal display, and in addition to receiving an input from the operator of the display device 200, also displays and outputs information to the operator. The storage resource 204 stores a program to be executed by the processor 202, and information needed by the processor 202. In this example, the storage resource 204 stores a display program 205. The display program 205 is for displaying a monitoring screen comprising the configuration information, performance, and status of a monitoring-target apparatus on the input/output device 203 based on information sent from the management computer 100. The processor 202 executes various processes by executing a program stored in the storage resource 204. For example, the processor 202, in accordance with executing the display program 205, receives various operator input from the input/output device 203, and, in addition, displays the monitoring screen related to the configuration, performance, and status of the monitoring-target apparatus on the input/output device 203 based on the information from the management computer 100.

Figure 17:
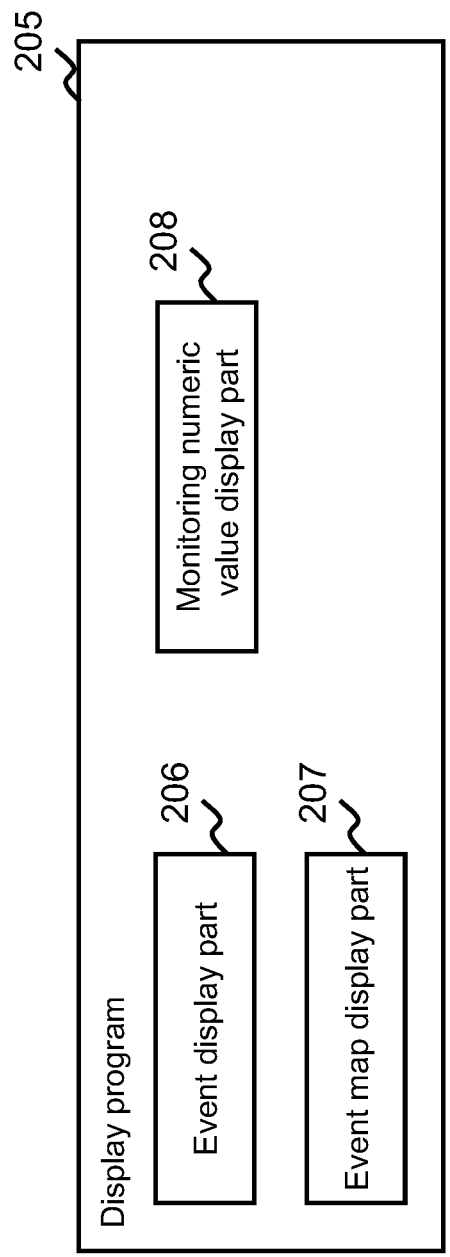
FIG. 17 is a block diagram of a display program related to the example.

FIG. 17 is a block diagram of the display program related to the example.

The display program 205 comprises an event display part 206, an event map display part 207, and a monitoring numeric value display part. The event display part 206 displays information of an event that has occurred in the monitoring-target apparatus. The event map display part 207 displays a map of the event that occurred in the monitoring-target apparatus, that is, a graph of events that occur relative to changes in time. The monitoring numeric value display part displays the monitoring numeric value obtained from the monitoring target.

Furthermore, the storage of the display program 205 in the storage resource 204 may be carried out in accordance with a request from the display device by the management computer 100 sending the relevant program to the display device. The display program 205 and the management program 140 may be stored in the same storage medium from the outset, or may be stored in different storage media. Similarly, right from the outset, the display program 205 and the management program 140 may be stored in the same program delivery computer, or may be stored in different program delivery computers.

Nest, the processing of the computer system related to the example will be explained.

Figure 18:
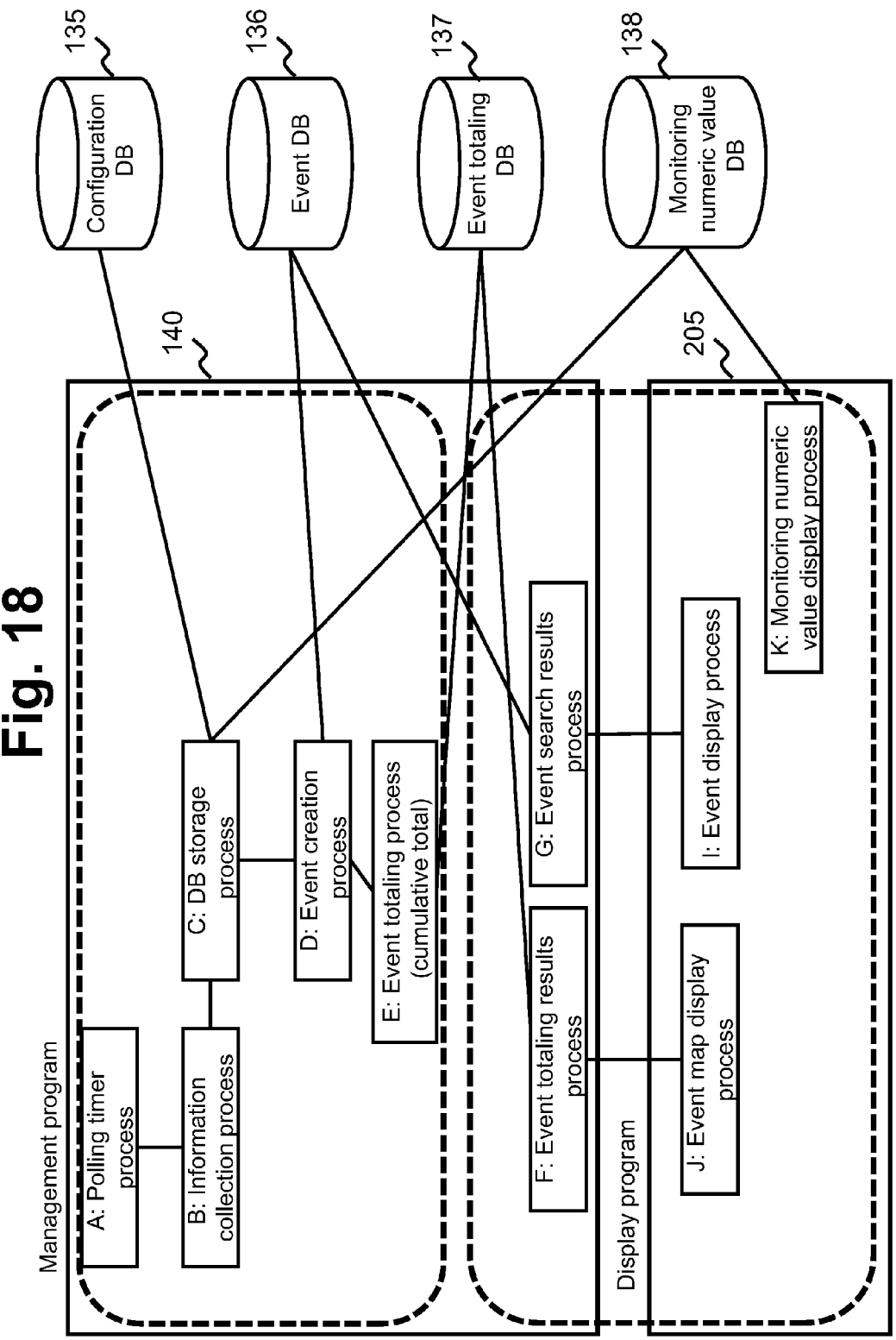
FIG. 18 is a diagram illustrating the overall processing in the computer system related to the example.

FIG. 18 is a diagram illustrating all of the processes of the computer system related to the example.

In accordance with executing the management program 140, the processor 102 of the management computer 100 executes a polling time process, and when a prescribed time arrives, executes an information collection process. Then, the processor 102 uses the collected information and the information of a configuration DB 135 (the configuration information management table (node) 121 and the configuration information management table (component) 122) to execute a DB storage process. Next, the processor 102 executes an event creation process with respect to information in which there was a change resulting from the DB storage process, and registers the event in an event DB 136 (the event table 125). Furthermore, the processor 102 executes an event totaling process and stores the totaling result(s) in an event result DB 137 (the event totaling table 126). The DB storage process also stores the monitoring numeric value (s) in a monitoring numeric value DB 138 (the monitoring numeric value management table 139).

Alternatively, in accordance with executing the display program 205, the processor 202 of the display device 200 executes an event map display process, and causes the management computer 100 to execute an event totaling result process. The processor 102 of the management computer 100 executes the event totaling result process, stores the totaling result in an event totaling DB 137 (the event totaling result table 128), and, in addition, sends the totaling result to the display device 200. The display device 200 displays the monitoring screen on the input/output device 203 using the totaling result(s).

Furthermore, the processor 202 of the display device 200 executes an event display process, and causes the management computer 100 to execute an event search result process.

The processor 102 of the management computer 100 executes the event search result process, stores the search result (s) in the event totaling DB 137 (the event search result table 127), and, in addition, sends the search result (s) to the display device 200. The display device 200 displays the monitoring screen on the input/output device 203 using the search result(s).

The management program 205 also acquires a value that had been stored in a monitoring numeric value DB 138 from the management program 140, and displays the monitoring numeric value(s) on the input/output device 203 (monitoring numeric value display process).

Figure 19B:
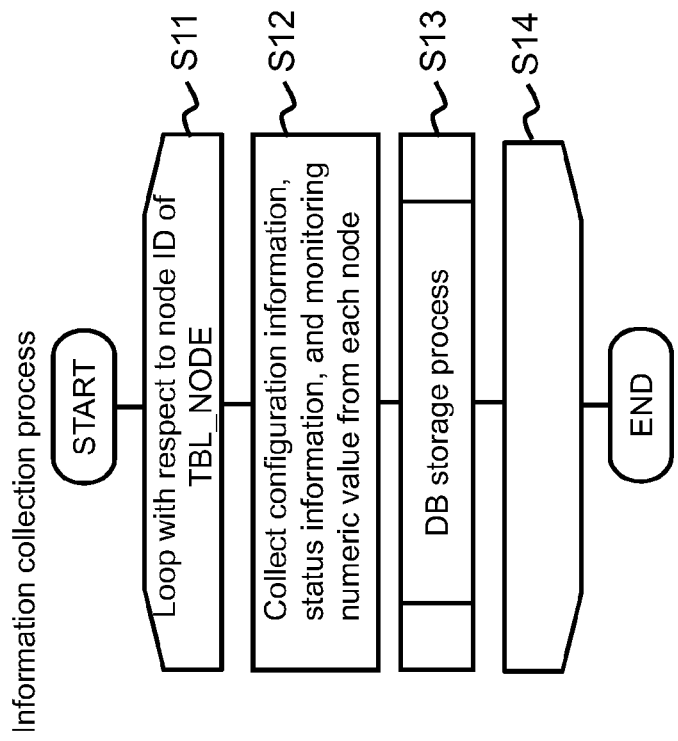
FIG. 19B is a flowchart of an information collection process related to the example.
Figure 19A:
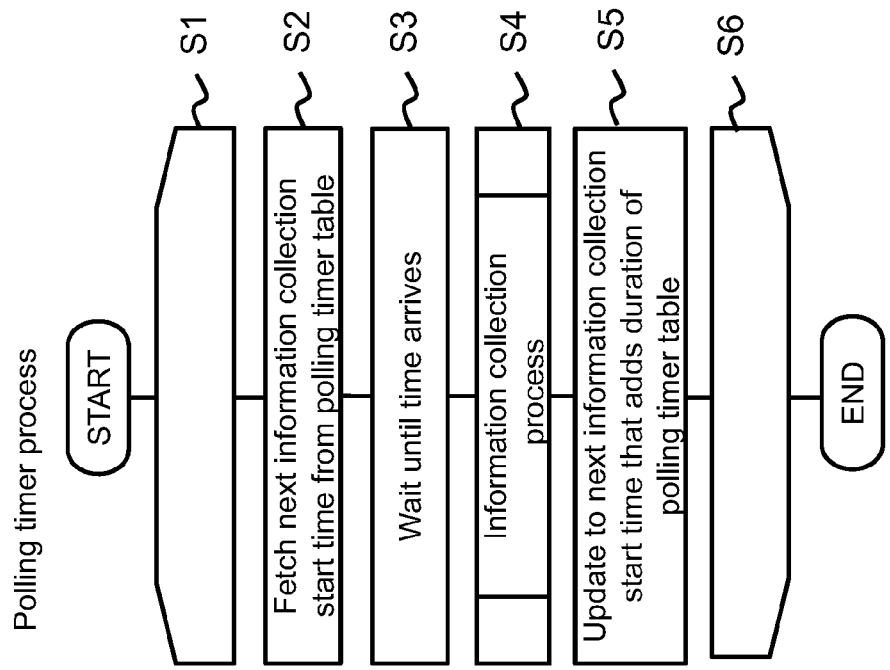
FIG. 19A is a flowchart of a polling timer process related to the example.

FIG. 19A is a flowchart of a polling timer process related to the example. FIG. 19B is a flowchart of an information collection process related to the example.

In the polling timer process, the processor 102 of the management computer 100 repeatedly executes the steps of Steps S1 through S6. First, the processor 102 fetches the next information collection start time of each information type in the polling timer table 129 (Step S2), waits until the next information collection start time arrives (Step S3), and executes the information collection process when it is the next information collection start time (Step 4). Next, the processor 102 updates the next information collection start time in accordance with adding an interval to the next information collection start time with respect to the target information for which the information collection processing of the polling timer table 129 was carried out (Step S5). Then, the information collection process is carried out for information of each information type by repeating the processing of Steps S1 through S6.

In the information collection process, the processor 102 repeatedly executes the processing of Steps S11 through S14 for the nodes of each node ID in the configuration information management table 121.

First, the processor 102 collects the information to be collected this time around (the configuration information, the status information, or the monitoring numeric value) from the corresponding node using the IP address and authentication information of the configuration information management table 121 (Step S12), and executes the DB storage process (Step S13). Then, after completing the processing for all the nodes, the processor 102 ends the information collection process, and returns to the polling timer process.

FIG. 20A is a flowchart of the DB storage process related to the example. FIG. 20B is a flowchart of the event creation process related to the example.

In the DB storage process, the processor 102 stores the collected monitoring numeric value in the monitoring numeric value management table 139 in a case where the monitoring numeric value is included in the collected monitoring information (Step S200). The processor 102 acquires the previously collected information from the collected information table 134 (Step S21), and compares this previously collected information to the information collected this time around (Step S22).

As a result of this, in a case where the information collected this time around matches the previously collected information (for example, a case where the statuses match when the collected information is status information, and a case where the configurations of the monitoring-target apparatuses match when the collected information is configuration information) (Step S23: YES), the processor 102 moves the processing to Step S26 since neither a configuration change nor a status change event has occurred.

Alternatively, in a case where the information collected this time around does not match the previously collected information, since this signifies that a status-changing event, or an event in which a configuration was added, changed, or removed occurred from the time that collection was carried out previously until collection was carried out this time around, the processor 102 executes an event creation process (Step S24). Next, the processor 102 reflects new information in the configuration information management table (node) 121 and the configuration information management table (component) 122 (Step S25), and moves the processing to Step S26.

In Step S26, the processor 102 updates the information collection start time of the configuration information management table (node) 121 to the information collection start time of this time around, ends the DB storage processing, and returns to the information collection process.

In the event creation process, the processor 102 creates a record corresponding to an event that has occurred (Step S31), and adds the relevant event record to the event table 125 (Step S32). At this point, the previous information collection start time of the configuration change event record is regarded as the information collection start time of the configuration information management table (node) 121, and the information collection start time is regarded as the information collection start time of this time around.

Next, the processor 102 executes an event totaling process (Step S33), and returns to the DB storage process.

FIG. 21 is a flowchart of the event totaling process related to the example.

In the event totaling process, the processor 102 identifies the duration during which an event occurred from the previous information collection start time and the information collection start time of the record corresponding to the event (Step S41), divides the number of events that occurred by the identified duration, and computes a change value, which is the number of occurrences per unit of time (Step S42). Next, the processor 102 adds the computed change value to the change value in the record, which corresponds to a time that is included between the previous information collection start time and the information collection start time, and which comprises the node and component corresponding to the event in the event totaling table 126 (Step 43), and returns to the event creation process. Furthermore, in Step S43, in a case where there is no record, which corresponds to multiple units of time included in the identified duration, and which comprises the node and the component corresponding to the event, the processor 102 creates the relevant record in the event totaling table 126.

FIG. 22A is a flowchart of an event map display process related to the example. FIG. 22B is a flowchart of an event display process related to the example. FIG. 22C is a flowchart of a monitoring numeric value display process related to the example.

In the event map display process, the processor 202 of the display device 200 acquires a display condition selected on the monitoring screen (Step S51), and sends this display condition to the management computer 100. In the management computer 100, the processor 102 receives the display condition, and executes the event totaling result process (Step S52). The processor 202 of the display device 200 creates and displays a monitoring screen (refer to FIG. 25) based on the event totaling result returned from the management computer 100 in accordance with the event totaling result process (Step S53). At this point, the processor 202 collectively displays a chart denoting the performance and the time axis of a map of change events. Furthermore, the execution of the event map display process, for example, starts upon receiving a request from the display device to display the monitoring screen (See FIG. 25).

The execution of the event display process, for example, is started when the change tab 705 on the monitoring screen (refer to FIG. 25) is pressed, and the processor 202 of the display device 200 acquires the display condition selected on the monitoring screen (Step S71), and sends this condition to the management computer 100. In the management computer 100, the processor 102 receives the display condition, and executes an event search result process (Step S72). The processor 202 of the display device 200 creates and displays a monitoring screen (refer to FIG. 26) based on the event search result returned from the management computer 100 in accordance with the event search result process (Step S73).

Figure 25:
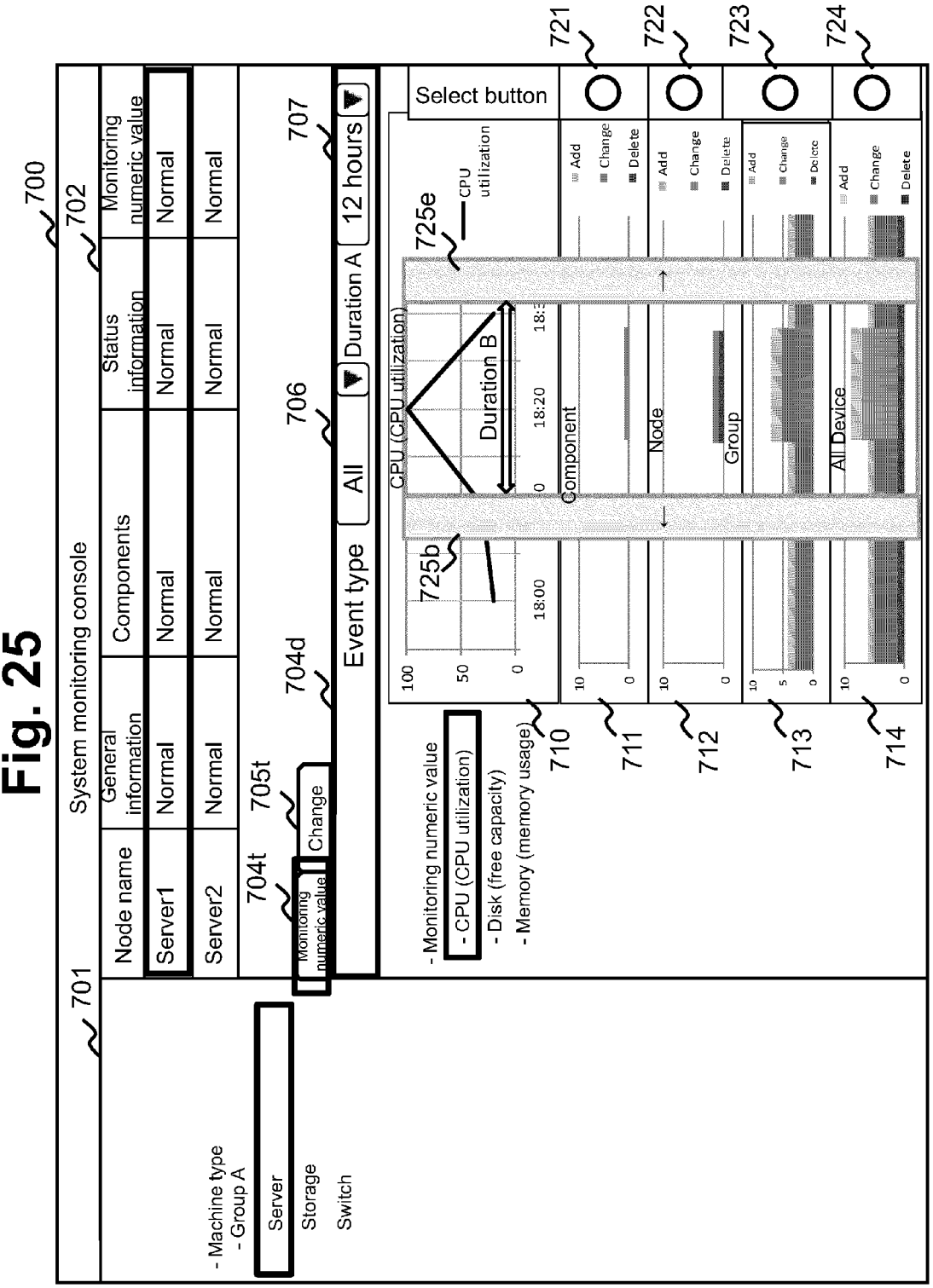
FIG. 25 is an example of a display of a monitoring screen related to the example.

The execution of the monitoring numeric value display process, for example, is started upon receiving a request from the display device to display a monitoring screen (refer to FIG. 25). As another example of starting the process, execution is started when the monitoring numeric value tab 705 on the monitoring screen (refer to FIG. 25) is pressed, and the processor 202 of the display device 200 acquires a display condition selected on the monitoring screen and sends this condition to the management computer 100 (Step S75). In the management computer 100, the processor 102 receives the display condition, reads the monitoring numeric value corresponding to the display condition from the monitoring numeric value management table 139, and sends this numeric value to the display device 200 (omitted from the drawing). The processor 202 of the display device 200 displays the monitoring numeric value received from the management computer 100 (Step S76).

FIG. 23 is a flowchart of an event totaling result process related to the example.

In the event totaling result process, the processor 102 of the management computer 100 registers the received condition in the display condition/filter condition table 132, applies the relevant condition to the display condition/filter condition definition table 124, derives the filter name corresponding to each map, and registers these filter names in the filter table 133 (Step S61).

Next, the processor 102 executes the processing of Steps S62 through S65 with respect to all the records of the event totaling result table 128.

First, the processor 102 determines whether or not the filter name of the record matches the derived filter name (Step S63), and in the case of a match (Step S63: YES), returns all the records in which the filter names of the event totaling result table 128 are a match to the display device 200 as the event totaling result (Step S64).

Alternatively, in a case where there is no match (Step 63: NO), the processor 102 executes the processing of Steps S66 through S69 with respect to all the records of the event totaling table 126.

The processor 102 determines whether or not the processing-target record matches the display condition/filter condition (Step S67). In the case of a match (Step S67: YES), the processor 102 adds the record with the derived filter name to the event totaling result table 128, and returns the relevant records to the display device 200. Alternatively, in a case where there is no match (Step S67: NO), the processor 102 moves the processing to the next record.

In accordance with this event totaling result process, the record of the event totaling table 126 that meets this condition is returned to the display device 200 as the event totaling result, and in the display device 200, as shown in FIG. 25, a graph of event change values within the target range having a time axis (for example, a common time axis), which corresponds to the time axis of a performance change graph related to the monitoring-target apparatus, is displayed in a monitoring numeric value display area 704*d* based on this record. This enables the operator to easily and appropriately grasp the occurrence of an event related to a performance change.

Figure 24:
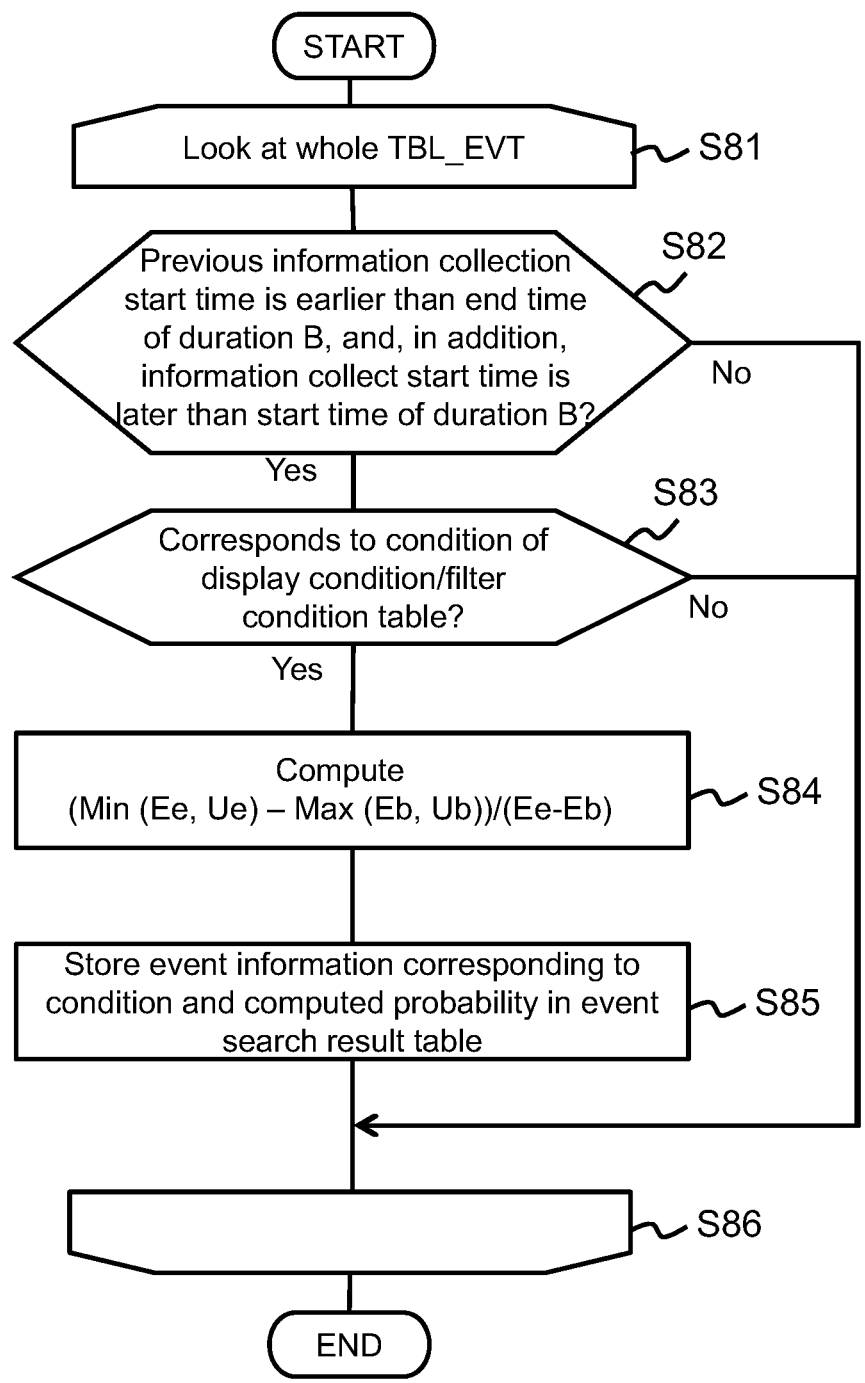
FIG. 24 is a flowchart of an event search result process related to the example.

FIG. 24 is a flowchart of an event search result process related to the example.

In the event search result process, the processor 102 of the management computer 100 registers a received condition in the display condition/filter condition table 132, and executes the processing of Steps S81 through S86 with respect to all the records of the event table 125.

The processor 102 determines whether or not the previous information collection start time of the processing-target record is earlier than an end time specified by duration B, and, in addition, the information collection start time of this time around is later than a start time specified by duration B (Step S82).

In a case where the result is that the previous information collection start time of the processing-target record is earlier than an end time specified by duration B, and the information collection start time of this time around is later than a start time specified by duration B (Step S82: YES), the processor 102 determines whether or not the processing-target record corresponds to a condition of the display condition/filter condition table 132 (Step S83). In a case where the result is that the processing-target record corresponds to the condition (Step S83: YES), the processor 102 computes the probability of an event corresponding to the relevant record occurring during duration B by computing (Min (Ee, Ue)−Max (Eb, Ub))/(Eb−Eb) (Step S84). As used here, Eb denotes the previous information collection start time, Ee denotes the information collection start time of this time around, Ub denotes the start time of duration B, Ue denotes the end time of duration B, Min (X, Y) denotes which is the smaller of X and Y, and MAX (X, Y) denotes which is the larger of X and Y.

Next, the processor 102 registers the information for the event record corresponding to the condition and the computed probability as a record of the event search result table 127 (Step S85). Furthermore, in either a case where the previous information collection start time of the processing-target record is earlier than an end time specified by duration B, but the information collection start time of this time around is not later than a start time specified by duration B (Step S82: NO), or a case where the processing-target record does not correspond to the condition (Step S83: NO), the processor 102 moves the processing to the next record.

Then, when the processing for all the records has ended, the processor 102 sends the record of the event search result table 127 to the display device 200 as the event search result. In accordance with this, information with respect to an event, which could have occurred during duration B (including the probability of the relevant event) is displayed in a change display area 705*d* of the monitoring screen. Therefore, the operator is able to use the monitoring screen to appropriately discern an event that could have occurred during duration B. Furthermore, the operator is able to appropriately discern the probability of an event occurring during duration B.

FIG. 25 is an example of a display of a monitoring screen related to the example.

The monitoring screen 700 is displayed in accordance with the processor 202 executing the display program 250 of the display device 200.

A display-target type selection area 701 and a display-target selection area 702 are displayed in the monitoring screen 700. A display area for a selected tab is also displayed in the monitoring screen 700. The tabs include a monitoring numeric value tab 704*t* and a change tab 705*t*. In a case where the monitoring numeric value tab 704*t* has been selected, the monitoring numeric value display area 704*d* is displayed, and in a case where the change tab 705*t* has been selected, the change display area 705*d* is displayed. In the drawing, the monitoring numeric value tab 704*t* has been selected, and the monitoring numeric value display area 704*d* is being displayed.

A candidate for a type that will be the target for displaying information is selectably displayed in the display-target type selection area 701. In the drawing, a situation in which a group, a server, a storage, and a switch are displayed as candidates, and a server belonging to group A has been selected is shown.

The display-target selection area 702 selectably displays a candidate for an apparatus (node) belonging to the type selected in accordance with the display-target type selection area 701. In the drawing, Server1 and Server2, which are servers of group A, are displayed, and Server1 has been selected as the display target.

The monitoring numeric value display area 704*d* displays various information regarding the target selected in the display-target selection area 702. An event type selection area 706 for selecting an event type to be displayed, and a duration A selection area 707 for selecting the duration (duration A) of the entire graph to be displayed are displayed in the monitoring numeric value display area 704*d*.

A monitoring numeric value display target is also selectably displayed in the monitoring numeric value display area 704*d*, and a graph 710 of the target monitoring numeric value that was selected is displayed. The monitoring numeric value graph 710, for example, is displayed based on information in the collected information table 134 sent by the processor 102 of the management computer 100. Also displayed in the monitoring numeric value display area 704*d* is a graph (event map) 711 regarding a component configuration change event, a graph (event map) 712 regarding a node configuration change event, a graph (event map) 713 regarding a group configuration change event, and a graph (event map) 714 of the configuration change events of all the devices. The monitoring numeric value graph 710, and the graphs 711 through 714 are displayed using the same time axis (the horizontal axis in the drawing). Therefore, the occurrence of a configuration change event at a point in time when a monitoring numeric value change occurred can be easily and appropriately discerned from the graph. In the graphs 711 through 714, the respective configuration change events of added, changed, and removed are displayed using different modes (for example, different colors). Furthermore, a start time specification bar 725B for specifying the start time of duration B, and an end time specification bar 725*e* for specifying the end time of duration B are displayed so that the operator can specify a portion of the duration (duration B) of interest with respect to the graph 710, and the graphs 711 through 714. The start time specification bar 725*b* and the end time specification bar 725*e* can be moved by dragging them using the input/output device 203.

Select buttons 721 through 724 for selecting whether or not to display a change event with respect to the target being displayed by the graph when the change tab 705*t* has been selected are displayed in each of the graphs 711 through 714. Furthermore, the select buttons 721 through 724 are controlled so that it is only possible to specify a graph in which a change event has occurred during the duration B.

Furthermore, although omitted from the drawing for space reasons, a scale may also be displayed on the time axes of the graph 711 through 714. However, the unit of scale does not have to be completely the same. This goes for the graph 710 as well. For example, whereas the graph 710 comprises a scale unit of 5 minutes, the scale unit for the graphs 711 through 714 may be 15 minutes. That is, a pair of scales denoting a common duration (need not be side by side) can exist in each graph.

Furthermore, in a case where both a change value and a monitoring numeric value are expressed using a histogram that has a prescribed time span as a unit, the length of the axis denoting the prescribe time span on the time axis of the change value graph, and the length of the axis denoting the prescribe time span on the time axis of the monitoring numeric value graph may be the same. In this case, the transition over time of both values can be readily confirmed even with a histogram.

Furthermore, when either one of the change value or the monitoring numeric value is expressed using a histogram with a prescribed time span for a unit, the remaining value may be expressed using an ordinary graph. In this case, the length of the time axis showing the histogram prescribed time span of the histogram format graph may be the same as the length of the time axis showing the prescribed time span of the ordinary graph. In this case as well, the transition over time of both values is easily confirmed.

Figure 26:
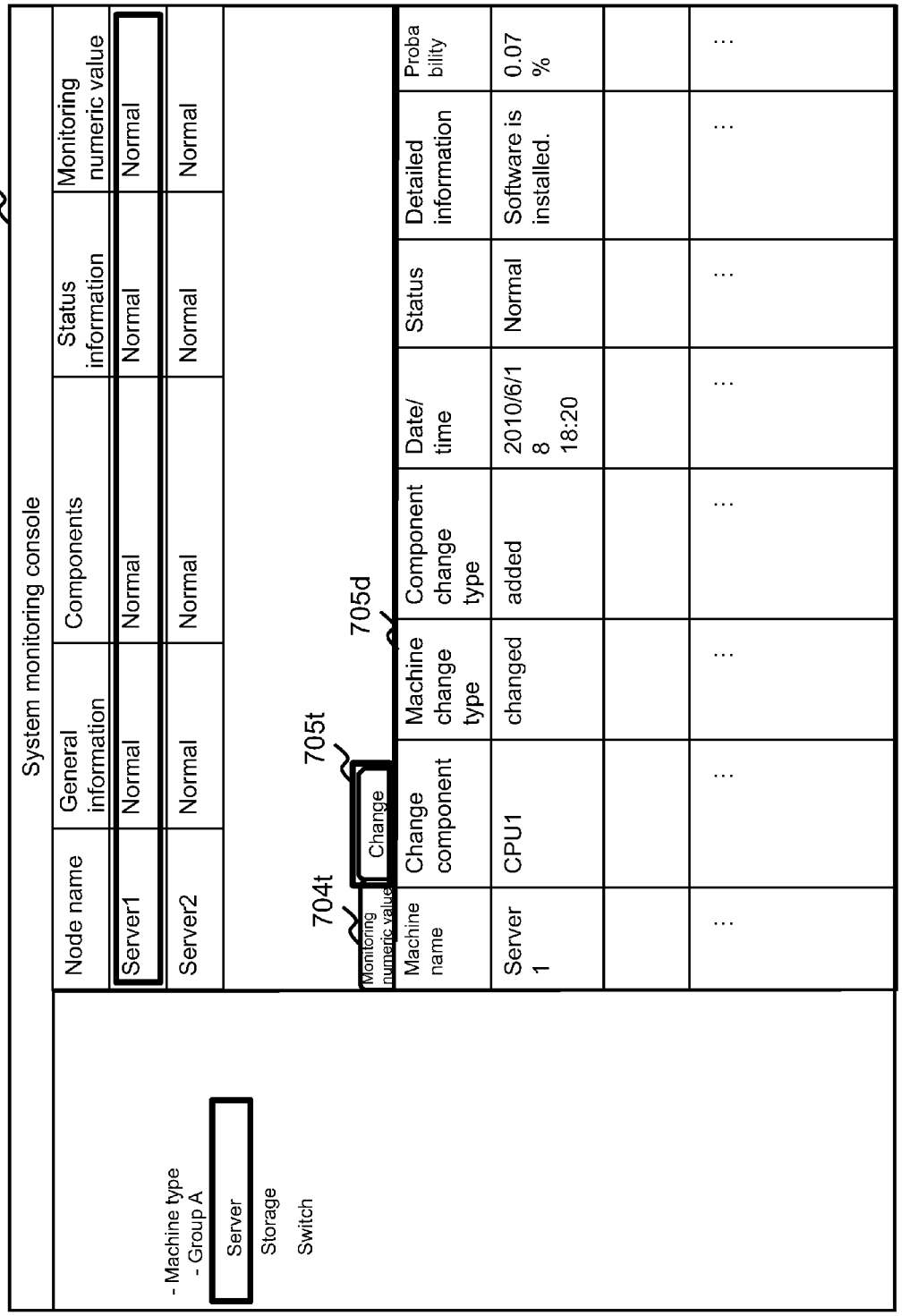
FIG. 26 is an example of a monitoring screen display showing a change event in a duration B related to the example.

FIG. 26 is an example of a display of a monitoring screen related to the example showing a change event in duration B.

The monitoring screen shown in the drawing is an example of a display in a case where the change tab 705t has been selected, and the change display area 705d is being displayed. Information of an event that occurred during duration B specified in the monitoring numeric value display area 704d is displayed in the change display area 705d. As the event information, for example, there is machine name, change component, model change type, component change type, date/time, status, detailed information, and probability. The probability shows the likelihood that the corresponding event occurred during duration B.

Next, a variation will be explained.

This variation uses a different mode in the monitoring screen in the above-described example.

Figure 27:
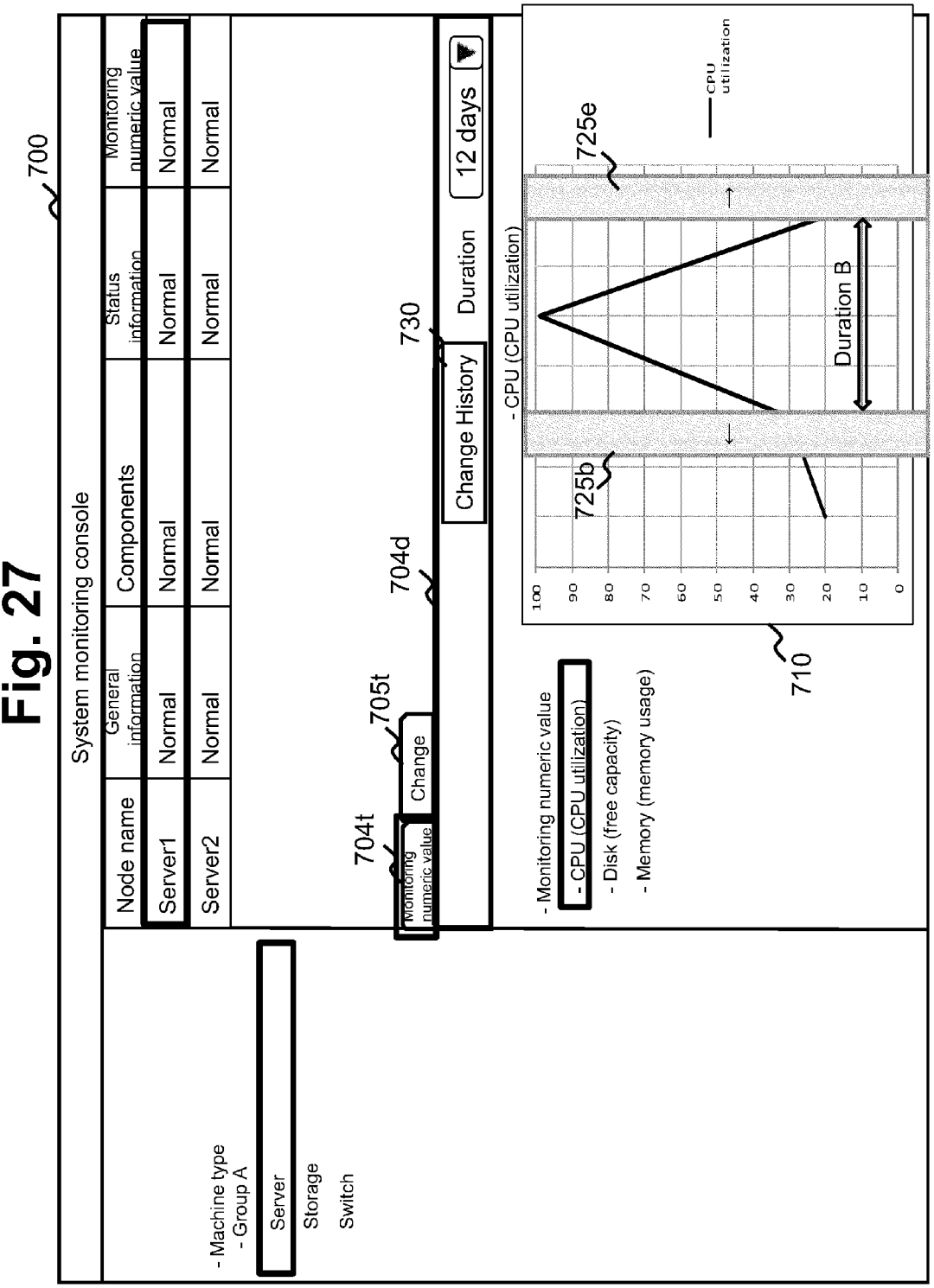
FIG. 27 is an example of a display of a monitoring screen related to a variation.

FIG. 27 is an example of a display of the monitoring screen related to the variation.

A change history button 730 for displaying a change event history is displayed in the monitoring numeric value display area 704d of the monitoring screen 700 related to the variation. Furthermore, a monitoring numeric value display target is selectably displayed in the monitoring numeric value display area 704d, and in addition to a monitoring numeric value graph 710 of the selected target being displayed, a start time specification bar 725b for specifying the start time of duration B, and an end time specification bar 725e for specifying the end time of duration B are displayed.

Figure 28:
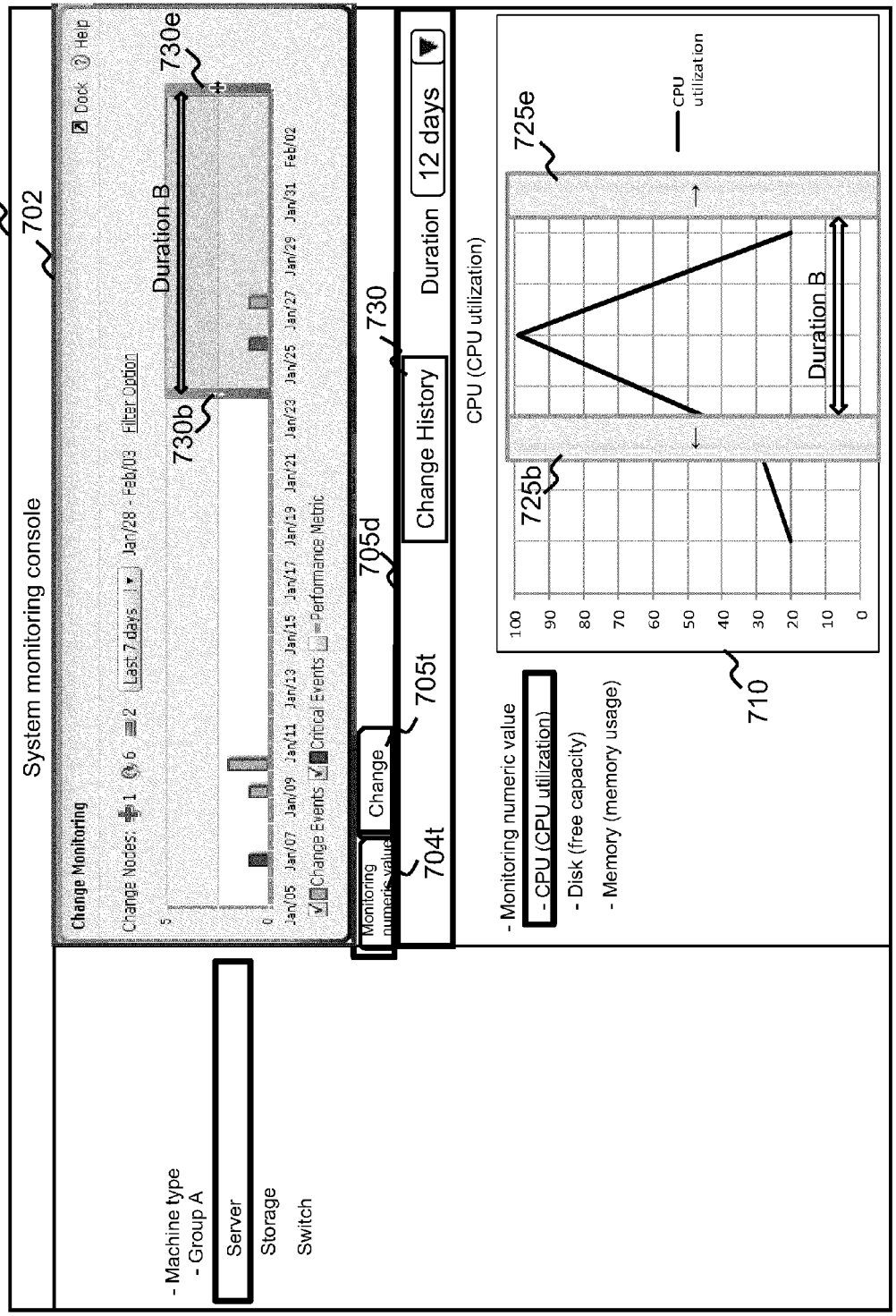
FIG. 28 is an example of a display of a monitoring screen comprising an event history graph related to a variation.

FIG. 28 is an example of a monitoring screen display comprising an event occurrence history graph related to the variation. FIG. 28 shows an example of a monitoring screen in a case where the change history button 730 has been pressed in the monitoring screen 700 shown in FIG. 27.

When the change history button 730 is pressed in the monitoring screen shown in FIG. 27, the processor 202 of the display device 200 displays a graph of an event occurrence history (event occurrence history graph) in the display target selection area 702. The processor 202 uses a different mode to display events related to configuration changes (change events) and events related to failures (critical events) in the event occurrence history graph. The processor 202 displays a start time bar 730b denoting the start time of duration B, and an end time bar 730e denoting the end time of duration B in the event occurrence history graph so as to make it possible to identify the duration B specified in the monitoring numeric value display area 705d. Since the duration B can be identified in the event occurrence history graph like this, an event related to a performance change can be appropriately discerned from the event occurrence history graph.

An example has been explained hereinabove, but, needless to say, the claims are not limited to this example, and various changes are possible without departing from the scope of the present invention.

For example, in the above example, in the monitoring screen 700 shown in FIG. 25, a component event map, which is narrow in scope, was sequentially developed into a broader scope event map on the screen, but the present invention is not limited to this, and an event map of a broad scope may also be sequentially developed into a smaller scope event map on the screen.

Furthermore, in the above-described example, a unit of time was used as the duration of each record in the event totaling table 126, but the present invention is not limited to this, and the duration does not have to be a unit of time, and in short, may be a prescribed time unit.

Furthermore, in the above-described example, the time at which the acquisition of information started is used as the reference time at information acquisition, but the above example is not limited to this, and the time at which the acquisition of information ends, or the time between acquisition start and acquisition end may be used as this reference time. Also, since the information acquisition process and the time measurement process are not processed simultaneously, and atomic processing is not guaranteed as in real-time processing, discrepancies will occur, for example, even in a case where time measurements are carried out before and after the information acquisition process. It is supposed that cases, in which either an acquisition period or an acquisition time are used in the example and the claims, are included in these variations. Therefore, the period in the case of the statement "xxx information acquisition period (or acquisition time)" need only satisfy one of two conditions, i.e., either (1) accuracy that enables a period during which xxx information can be fully acquired to be identified in a case where the relevant period has been displayed to the user of the monitoring system, or (2) accuracy that enables either a time difference or a time interval with respect to the previous xxx information acquisition time to be computed based on the relevant period. This is not limited to information, but rather is common to various period/time-related processing. Naturally, the same holds true for a start time (start period) and an end time (end period).

In the above explanation, the monitoring system comprises one or more processors and one or more storage resources, and monitors a monitoring-target apparatus and/or a component included in the above-mentioned monitoring-target apparatus, and the above-mentioned one or more storage resources store a first time interval and a second time interval for acquiring monitoring-target monitoring information, and the above-mentioned first time interval and the above-mentioned second time interval are applied to different types of monitoring targets or monitoring information. It was explained that the above-mentioned one or more processors execute the following processing.

(A1) Acquire a first monitoring information, which is a first type of monitoring information of a first monitoring target, in accordance with the above-mentioned first time interval.

(A2) Acquire a second monitoring information, which is a second type of monitoring information of a second monitoring target, in accordance with the above-mentioned second time interval.

(B1) Identify a change over time with respect to the above-mentioned first monitoring information, and compute a first change value based on the above-mentioned identified change and the above-mentioned first time interval. (B2) Identify a change over time with respect to the above-mentioned second monitoring information, and compute a second change value based on the above-mentioned identified change and the above-mentioned second time interval. (C) Display the above-mentioned first change value and the above-mentioned second change value on the same screen.

Furthermore, the computation of the above-mentioned first change value and the above-mentioned second change value is generated based on a prescribed conversion process having a characteristic by which the absolute value of the change value becomes smaller as the computation source time interval becomes longer. As one example of this prescribed conversion process, a value obtained by dividing the number of events by the time interval between the previous monitoring information collection time and the monitoring collection time of this time around was explained. However, the prescribed conversion process may be a different formula as long as this formula has the characteristic by which the absolute value of the change value becomes smaller as the time interval becomes longer. This indicates that this characteristic is "a characteristic by which the change value becomes smaller as the time interval becomes longer" in a case where the change value is always a positive value, and indicates that this characteristic is such that "the change value becomes larger as the time interval becomes longer" in a case where the change value is always a negative value. This prescribed conversion process may also be referred to as "the change value approaches zero as the time interval becomes longer".

A prescribed conversion process like this, for example, is an example which treats the number of events as minus in the case of an event that signifies removal. The number of other events may be divided by a value that was converted using an $n^{th}$ power time interval, a log function, or an exponential function. Furthermore, the prescribed conversion process may be such that the change value becomes zero when the time interval exceeds a certain fixed value (constant 1/constant 2) as with Max (number of events×constant 1−time interval×constant 2, 0).

Furthermore, the first and second time intervals may be used in accordance with the type of the monitoring information, or may be used in accordance with the monitoring target.

Furthermore, it was explained that the monitoring system is such that the time span between a first monitoring information acquisition time and the previous acquisition time, which constitutes the source of the above-mentioned first change value (first time span), and the time span between a second monitoring information acquisition time and the previous acquisition time, which constitutes the source of the above-mentioned second change value (second time span), overlap at least partially, and may be displayed so that the display of the above-mentioned first change value is temporally related to the above-mentioned second change value. This related display, for example, is the screen of FIG. 25 (However, there is no need for a graph display in a case where there is no chronological display). Other related displays might include a case where the first change value and the second change value are lined up in tabular form in either rows or columns corresponding to a time frame, or a case where the first change value and the second change value are displayed linked in a straight line. Furthermore, the first time span is typically the first time interval, and the second time span is typically the second time interval. For this reason, for example, in a case where the first time interval is one day, and information is acquired at 12:01 a.m., and the second time interval is every hour, and information is acquired at exactly 12 midnight, the first time span, for example, will be from 2011/03/01 00:01:00 to less than 2011/03/02 00:01:00 (when managed in seconds, it would be 00:00:59), and the second time span, for example, will be from 2011/03/01 00:00:00 to less than 01:00:00 (when managed in seconds, it would be 00:59:59). Therefore, the overlapping period would be from 00:01:00 to less than 01:00:00 (when managed in seconds, it would be 00:59:59) of 2011/03/01 (refer to FIG. 30).

Furthermore, the above-mentioned (C) may (C1) display a first graph, which chronologically displays the above-mentioned first change value with reference to a first axis denoting time ordering, and a second graph, which chronologically displays the above-mentioned second change value with reference to a second axis denoting time ordering, (C2) orient the above-mentioned first axis and the above-mentioned second axis in the same direction, and (C3) overlap the portion of the above-mentioned first axis showing the above-mentioned overlapping period with the portion of the above-mentioned second axis showing the above-mentioned overlapping period when the portion of the above-mentioned first axis showing the above-mentioned overlapping period is moved in a prescribed angular direction with respect to the above-mentioned first axis. Furthermore, the graph in FIG. 25 uses an example of a stacked graph, but another graph may be used as long as the change values can be displayed chronologically. Furthermore, the first change value and the second change value may also be displayed in the same graph.

Furthermore, the chronological display of the change value may be displayed in a tabular form, which chronologically displays the above-mentioned first change value and the above-mentioned second change value in reference to a prescribed row or column denoting time ordering.

Furthermore, the above-mentioned one or more storage resources may be configured so as to store monitoring numeric value chronological information (for example, chronological information such as a monitoring numeric value management table), which comprises a first monitoring numeric value related to the above-mentioned first monitoring target, and the above-mentioned one or more processors may (D) display a third graph, which chronologically displays the above-mentioned first monitoring numeric value with reference to a third axis denoting time ordering, (D1) orient the above-mentioned first axis and the above-mentioned third axis in the same direction, and (D2) overlap the portion of the above-mentioned first axis showing the above-mentioned overlapping period with the portion of the above-mentioned third axis showing the above-mentioned overlapping period when the portion of the above-mentioned first axis showing the above-mentioned overlapping period is moved in a prescribed angular direction with respect to the above-mentioned first axis. Furthermore, the prescribed angular direction typically is 90 degrees straight up to the horizontal time axis as in FIG. 25. However, either an angle of roughly 90 degrees or 45 degrees may be used. This will also hold true in the case in which the display device is equipped with a three-dimensional display device.

Furthermore, the change value display may be a histogram of each prescribed time span as shown in FIG. 28. Even in a case where chronological graphs of change values such as 711 through 714 of FIG. 25 are displayed in column 705d of FIG. 28, the simultaneous comparison of change values is easily performed by arranging the histogram and start date/times and end date/times of the change value graphs vertically (that is, at the prescribed angle of 90 degrees). This is the same even when the change values in the case of FIG. 28 are displayed in histogram form, and the measurement numeric values are displayed in graph form.

Furthermore, the above-mentioned one or more processors may (E) receive a display request specifying a prescribed display time slot, and (F) display a change in the above-mentioned first monitoring information, which occurred within the above-mentioned prescribed display time slot, together with the probability that the change has occurred within the above-mentioned prescribed display time slot, and the probability of the above-mentioned (F) may be computed in accordance with the proportion to which the time span between a first monitoring information acquisition time and the previous acquisition time, which constitutes the source of the above-mentioned first monitoring information change, is included in the above-mentioned prescribed display time slot. Furthermore, the computation method may be a method other than the above-described (Min (Ee, Ue)−Max (Eb, Ub))/(Eb−Eb). Typically, in a case where the other numeric values are the same, a function that tends to increase the value when there is a large degree of overlap between the above-mentioned time span (that is, from Eb to Ee) and the duration B (that is from Ub to Ue) may be used.

Furthermore, the above-mentioned first monitoring target may be a prescribed component included in a prescribed monitoring-target apparatus, and a change over time with respect to the above-mentioned first monitoring information may be an addition, a change, or a removal of the above-mentioned prescribed component, and the above-mentioned second monitoring target may be the above-mentioned prescribed monitoring-target apparatus, and a change over time with respect to the above-mentioned second monitoring information may be an addition, a change, or a removal of at least a component included in the above-mentioned prescribed monitoring-target apparatus other than the above-mentioned prescribed component. Changing the perspective of the preceding explanation, the present invention can also be seen as a method for monitoring a monitoring-target apparatus and/or a component comprising a monitoring-target apparatus as a monitoring target, in which (a0) multiple time intervals for acquiring monitoring information with respect to multiple the above-mentioned monitoring targets are stored, (A) multiple pieces of the above-mentioned monitoring information are acquired from the multiple the above-mentioned monitoring targets in accordance with the above-mentioned multiple time intervals, (B) a change value based on a change over time and a time interval is computed with respect to each of the multiple pieces of the above-mentioned monitoring information, and (C) multiple the above-mentioned change values corresponding to the multiple pieces of the above-mentioned monitoring information are displayed in the same screen, and the above-mentioned change value computation is generated based on a prescribed conversion process having a characteristic by which the absolute value of the above-mentioned change value becomes smaller as the time interval, which is the source of the computation, becomes longer.

Furthermore, with respect to each of the multiple the above-mentioned change values, it can also be said that the time span between a monitoring information acquisition time and the previous acquisition time, which constitutes the source of the computation, at least partially overlaps with the time span of another change value, and the display of (C) shows that a certain the above-mentioned change value and another the above-mentioned change value are temporally related.

Furthermore, it can be said that the change value display of the above-mentioned (C) displays multiple change value graphs, which chronologically display the multiple the above-mentioned change values with reference to a first axis denoting time ordering, and multiple the above-mentioned first axes are oriented in the same direction, and have the same timescale interval.

Furthermore, it can also be said that monitoring numeric value chronological information, which comprises a prescribed monitoring numeric value related to a prescribed monitoring target, is stored, a numeric value graph, which chronologically displays the above-mentioned monitoring numeric value with reference to a second axis denoting time ordering, is displayed, the above-mentioned first axis and the above-mentioned second axis are oriented in the same direction, and the length of a first portion denoting a prescribed time span of the above-mentioned first axis and the length of a second portion denoting the above-mentioned prescribed time span of the above-mentioned second axis are equivalent.

Furthermore, it can also be said that (E) a display request specifying a prescribed display time slot is received, and (F) a change in the above-mentioned monitoring information, which occurred within the above-mentioned prescribed display time slot, is displayed together with the probability that the change occurred within the above-mentioned prescribed display time slot, and the probability of the above-mentioned (F) is computed in accordance with the proportion to which the time span between a first monitoring information acquisition time and the previous acquisition time, which constitutes the source of the above-mentioned change, is included in the above-mentioned prescribed display time slot.

Furthermore, it can also be said that multiple the above-mentioned monitoring targets comprise at least a prescribed monitoring-target apparatus and a prescribed component included in the above-mentioned prescribed monitoring-target apparatus, and the change over time in the above-mentioned monitoring information related to the above-mentioned prescribed component is an addition, a change, or a removal of the above-mentioned prescribed component.

In can also be said that the change over time in the above-mentioned monitoring information related to the above-mentioned prescribed monitoring-target apparatus is an addition, a change, or a removal of at least a component included in the above-mentioned prescribed monitoring-target apparatus other than the above-mentioned prescribed component.

In addition, viewing the preceding explanation from a perspective that does not insist on multiple time intervals, it can be said that the above-mentioned one or more processors: (1) repeatedly acquire a first type of monitoring information of a first monitoring target, and store chronological information of the monitoring information; (2) repeatedly acquire a second type of measurement numeric value of a second monitoring target, and store chronological information of the measurement numeric value; (3) identify a change from the previous monitoring information of the above-mentioned prescribed monitoring information with respect to prescribed monitoring information included in the chronological information of the above-mentioned monitoring information, identify the time interval between the above-mentioned previous monitoring information acquisition time and the above-mentioned prescribed monitoring information acquisition time, and measure a change value based on the above-mentioned change and the above-mentioned time interval; and (4) display a first graph, which chronologically displays the above-mentioned change value with reference to a first axis denoting time ordering and a measurement numeric value graph, which chronologically displays the above-mentioned measurement numeric value with reference to a second axis denoting time ordering on the same screen, and the computation of the above-mentioned change value is generated based on a prescribed conversion process having a characteristic by which the absolute value of the above-mentioned change value becomes smaller as the above-mentioned time interval, which is the computation source, becomes longer, the above-mentioned first axis and the above-mentioned second axis are oriented in the same direction, and the length of a first portion of the above-mentioned first axis denoting a prescribed time span and the length of a second portion of the above-mentioned second axis denoting the above-mentioned prescribed time span are equivalent.

REFERENCE SIGNS LIST

10 Monitoring system
100 Management computer
200 Display device
300 Host computer
400 Storage subsystem
500 Network apparatus
600 Network

The invention claimed is:

1. A monitoring system for monitoring a plurality of targets, comprising:
a storage resource storing a value for a first time interval and a value for a second time interval, wherein the value for the first time interval is different from the value for the second time interval, and
a processor configured to:
(A1) acquire first information of a first target which is a part of the plurality of targets, compute a next acquiring time for the first target by adding the first time interval to a last acquired time of the first target, and wait until the next acquiring time of the first target for performing next information acquisition for the first target, the first information indicating a configuration or status of the first target;
(B1) identify a first configuration or status change by comparing a newest first information with a previously acquired first information, and compute a first change value based on the first configuration or status change identified and the first time interval;
(A2) acquire second information of a second target which is a part of the plurality of targets and is different from the first target, compute a next acquiring time for the second target by adding the second time interval to a last acquired time of the second target, and wait until the next acquiring time of the second target for performing next information acquisition for the second target, the second information indicating a configuration or status of the second target;
(B2) identify a second configuration or status change by comparing a newest second information with a previously acquired second information, and compute a second change value based on the second configuration or status change identified and the second time interval; and
(C) display the first change value and the second change value on a same screen on the graphs showing the certain time period,
wherein the computation of the first change value and the second change value is generated based on a prescribed conversion process having a characteristic by which an absolute value of a change value becomes smaller as the time interval that is a basis of the computation becomes longer.

2. The monitoring system according to claim 1, wherein, in the (C),
(C1) a first graph, which chronologically displays the first change value with reference to a first axis denoting time ordering, and a second graph, which chronologically displays the second change value with reference to a second axis denoting time ordering are displayed;
(C2) the first axis and the second axis are oriented in the same direction; and
(C3) a portion of the first axis showing the overlapping period is overlapped with a portion of the second axis showing the overlapping period when the portion of the first axis showing the overlapping period is moved in a prescribed angular direction with respect to the first axis.

3. The monitoring system according to claim 2,
wherein the storage resource stores monitoring numeric value chronological information comprising a first monitoring numeric value related to the first target, and
wherein the processor is configured to:
(D) display a third graph, which chronologically displays the first monitoring numeric value with reference to a third axis denoting time ordering;
(D1) orient the first axis and the third axis in the same direction; and
(D2) overlap the portion of the first axis showing the overlapping period with the portion of the third axis showing the overlapping period when the portion of the first axis showing the overlapping period is moved in a prescribed angular direction with respect to the first axis.

4. The monitoring system according to claim 1, wherein, in the (C),
(C4) a third graph, which chronologically displays the first change value and the second change value with reference to a first axis denoting time ordering, is displayed.

5. The monitoring system according to claim 1, wherein, in the (C),
(C5) a first table, which chronologically displays the first change value and the second change value with reference to a prescribed row or column denoting time ordering, is displayed.

6. The monitoring system according to claim 1,
wherein the processor is configured to:
(E) receive a display request specifying a prescribed display time slot; and
(F) display a certain change in the first information, which has occurred within the prescribed display time slot, together with the probability of the certain change occurring within the prescribed display time slot by,
(F1) acquire a first time at which the first information including the certain change is firstly acquired, and a second time at which the first information not including the certain change is lastly acquired;
(F2) acquire a first term between the first time and the second time;
(F3) compute a ratio between the first term and the prescribed display time slot; and
(F4) compute the probability of the certain change using the computed ratio.

7. A monitoring system for monitoring a plurality of targets, comprising:
a storage resource storing a value for a first time interval and a value for a second time interval, wherein the value for the first time interval is different from the value for the second time interval, and a processor configured to:

(A1) acquire first information of a first information type of the plurality of targets, compute a next acquiring time for the first information type by adding the first time interval to a last acquired time of the first information type, and wait until the next acquiring time of the first information type for performing next information acquisition for the first information type, wherein the first information indicates a configuration or status of the first information type;

(B1) identify a first configuration or status change by comparing a newest first information with a previously acquired first information, and compute a first change value based on the first configuration or status change identified and the first time interval;

(A2) acquire second information of a second information type of the plurality of targets, compute a next acquiring time for the second information type by adding the second time interval to a last acquired time of the second information type, and wait until the next acquiring time of the second information type for performing next information acquisition for the second information type, wherein the second information type is different from the first information type, and the second information indicates a configuration or status of the second information type;

(B2) identify a second configuration or status change by comparing a newest second information with a previously acquired second information, and compute a second change value based on the second configuration or status change identified and the second time interval;

(C) display the first change value and the second change value on a same screen on the graphs showing the certain time period, wherein the computation of the first change value and the second change value is generated based on a prescribed conversion process having a characteristic by which an absolute value of a change value becomes smaller as the time interval that is a basis of the computation becomes longer.

8. The monitoring system according to claim 7, wherein, in the (C), (C1) a first graph, which chronologically displays the first change value with reference to a first axis denoting time ordering, and a second graph, which chronologically displays the second change value with reference to a second axis denoting time ordering are displayed;

(C2) the first axis and the second axis are oriented in the same direction; and (C3) a portion of the first axis showing the overlapping period is overlapped with a portion of the second axis showing the overlapping period when the portion of the first axis showing the overlapping period is moved in a prescribed angular direction with respect to the first axis.

9. The monitoring system according to claim 8, wherein the storage resource stores monitoring numeric value chronological information comprising a first monitoring numeric value related to the first information type, and wherein the processor is configured to:

(D) display a third graph, which chronologically displays the first monitoring numeric value with reference to a third axis denoting time ordering;

(D1) orient the first axis and the third axis in the same direction; and (D2) overlap the portion of the first axis showing the overlapping period with the portion of the third axis showing the overlapping period when the portion of the first axis showing the overlapping period is moved in a prescribed angular direction with respect to the first axis.

10. The monitoring system according to claim 7, wherein, in the (C), (C4) a third graph, which chronologically displays the first change value and the second change value with reference to a first axis denoting time ordering, is displayed.

11. The monitoring system according to claim 7, wherein, in the (C), (C5) a first table, which chronologically displays the first change value and the second change value with reference to a prescribed row or column denoting time ordering, is displayed.

12. The monitoring system according to claim 7, wherein the processor is configured to:

(E) receive a display request specifying a prescribed display time slot; and (F) display a certain change in the first information, which has occurred within the prescribed display time slot, together with the probability of the certain change occurring within the prescribed display time slot by, (F1) acquire a first time at which the first information including the certain change is firstly acquired, and a second time at which the first information not including the certain change is lastly acquired;

(F2) acquire a first term between the first time and the second time;

(F3) compute a ratio between the first term and the prescribed display time slot; and (F4) compute the probability of the certain change using the computed ratio.

13. A method of monitoring a plurality of targets, the method comprising:

(a0) storing a value for a first time interval and a value for a second time interval, wherein the value for the first time interval is different from the value for the second time interval;

(A1) acquiring first information of a first target which is a part of the plurality of targets, computing a next acquiring time for the first target by adding the first time interval to a last acquired time of the first target, and waiting until the next acquiring time of the first target for performing next information acquisition for the first target, the first information indicating a configuration or status of the first target;

(B1) identifying a first configuration or status change by comparing a newest first information with a previously acquired first information, and computing a first change value based on the first configuration or status change identified and the first time interval;

(A2) acquiring second information of a second target which is a part of the plurality of targets and is different from the first target, computing a next acquiring time for the second target by adding the second time interval to a last acquired time of the second target, and waiting until the next acquiring time of the second target for performing next information acquisition for the second target, the second information indicating a configuration or status of the second target;

(B2) identifying a second configuration or status change by comparing a newest second information with a previously acquired second information, and computing a second change value based on the second configuration or status change identified and the second time interval; and (C) displaying the first change value and the second change value on a same screen on the graphs showing the certain time period, wherein the computation of the first change value and the second change value is generated based on a prescribed conversion process having a characteristic by which an absolute value of a change value becomes smaller as the time interval that is a basis of the computation becomes longer.

14. The method according to claim 13, wherein, in the (C), (C1) a first graph, which chronologically displays the first change value with reference to a first axis denoting time ordering, and a second graph, which chronologically displays the second change value with reference to a second axis denoting time ordering are displayed;

(C2) the first axis and the second axis are oriented in the same direction; and (C3) a portion of the first axis showing the overlapping period is overlapped with a portion of the second axis showing the overlapping period when the portion of the first axis showing the overlapping period is moved in a prescribed angular direction with respect to the first axis.

15. The method according to claim 14, comprising:

storing monitoring numeric value chronological information comprising a first monitoring numeric value related to the first target, (D) displaying a third graph, which chronologically displays the first monitoring numeric value with reference to a third axis denoting time ordering;

(D1) orienting the first axis and the third axis in the same direction; and (D2) overlapping the portion of the first axis showing the overlapping period with the portion of the third axis showing the overlapping period when the portion of the first axis showing the overlapping period is moved in a prescribed angular direction with respect to the first axis.

16. The method according to claim 13, wherein, in the (C), (C4) a third graph, which chronologically displays the first change value and the second change value with reference to a first axis denoting time ordering, is displayed.

17. The method according to claim 13, wherein, in the (C), (C5) a first table, which chronologically displays the first change value and the second change value with reference to a prescribed row or column denoting time ordering, is displayed.

18. The method according to claim 13, comprising:

(E) receiving a display request specifying a prescribed display time slot; and (F) displaying a certain change in the first information, which has occurred within the prescribed display time slot, together with the probability of the certain change occurring within the prescribed display time slot by:

(F1) acquiring a first time at which the first information including the certain change is firstly acquired, and a second time at which the first information not including the certain change is lastly acquired;

(F2) acquiring a first term between the first time and the second time;

(F3) computing a ratio between the first term and the prescribed display time slot; and (F4) computing the probability of the certain change using the computed ratio.

* * * * *